United States Patent
Nimura et al.

(10) Patent No.: US 8,495,704 B2
(45) Date of Patent: Jul. 23, 2013

(54) INFORMATION PROCESSING APPARATUS AND COMPUTER PRODUCT

(75) Inventors: Kazuaki Nimura, Kawasaki (JP); Kouichi Yasaki, Kawasaki (JP); Yousuke Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 12/561,525

(22) Filed: Sep. 17, 2009

(65) Prior Publication Data
US 2010/0077485 A1    Mar. 25, 2010

(30) Foreign Application Priority Data
Sep. 24, 2008    (JP) .................................. 2008-244799

(51) Int. Cl.
H04L 29/06    (2006.01)

(52) U.S. Cl.
USPC .................................. 726/2; 726/27; 713/340

(58) Field of Classification Search
USPC ........................................ 726/27, 2; 713/340
See application file for complete search history.

(56) References Cited

U.S. PATENT DOCUMENTS

| | | | |
|---|---|---|---|
| 6,587,418 B1 | 7/2003 | Ozaki et al. | |
| 7,516,478 B2 | 4/2009 | Limont et al. | |
| 7,603,435 B2 | 10/2009 | Welingkar et al. | |
| 2004/0027612 A1* | 2/2004 | Saruwatari et al. | 358/1.15 |
| 2006/0234679 A1 | 10/2006 | Matsumoto et al. | |
| 2007/0093243 A1 | 4/2007 | Kapadekar et al. | |
| 2008/0115226 A1* | 5/2008 | Welingkar et al. | 726/28 |
| 2008/0200220 A1* | 8/2008 | Jackson | 455/574 |

FOREIGN PATENT DOCUMENTS

| | | |
|---|---|---|
| EP | 1170969 A1 | 1/2002 |
| JP | H08-251660 | 9/1996 |
| JP | 2002-15525 A | 1/2002 |
| JP | 2003-70063 | 3/2003 |
| JP | 2003-288273 A | 10/2003 |
| JP | 2005-332563 A | 12/2005 |
| JP | 2006-303817 | 11/2006 |

OTHER PUBLICATIONS

Germany Office Action dated Apr. 19, 2012 for corresponding Germany Application No. 102009041191.7, with Partial English-language Translation.

Japanese Office Action mailed Jan. 8, 2013 for corresponding Japanese Application No. 2008-244799, with Partial English-language Translation.

* cited by examiner

Primary Examiner — Jung Kim
Assistant Examiner — Ayoub Alata
(74) Attorney, Agent, or Firm — Fujitsu Patent Center

(57) ABSTRACT

An apparatus having a communication section operable to communicate with a central apparatus, and a storage control section operable to control writing onto, and reading from, a storage medium. The apparatus receives a control command transmitted from the central apparatus. The apparatus, if the received command is a security command, acquires process information indicating information on the security process. The apparatus transmits the process information acquired to the central apparatus. The apparatus, if the received command is a security command, executes the security process. The apparatus, if the received command is an inquiry command, acquires the status of the execution of the security process. The apparatus transmits the security process execution status acquired to the central apparatus. The apparatus, if the execution of the security process is completed, transmits the fact that the execution of the security process in the storage medium is completed to the central apparatus.

6 Claims, 21 Drawing Sheets

FIG. 13

| SMS HEADER | COMMAND CATEGORY |
|---|---|

FIG. 14

| SMS ACK | RECEPTION COMPLETED |

FIG. 15

| SMS HEADER | PROCESS INFORMATION |

FIG. 16

| SMS HEADER | EXECUTION COMPLETED |

INFORMATION PROCESSING APPARATUS AND COMPUTER PRODUCT

CROSS-REFERENCE TO RELATED APPLICATION(S)

This application is related to and claims priority to Japanese Patent Application No. 2008-244799 filed on Sep. 24, 2008 and incorporated by reference herein.

BACKGROUND

1. Field

The present invention relates to a information processing apparatus, and computer products, which include a communication section which can communicate with a central apparatus via a communication line, and a storage control section which controls a writing onto and reading from a storage medium.

2. Description of the Related Art

To date, as the number of terminal apparatuses which include a recording medium has been increasing, an information leak due to a theft or loss of a terminal apparatus has been seen as a problem.

A portable terminal apparatus information security system including an authentication device which, when there is a request for information security for a portable terminal apparatus which enables an execution of a given information security process appropriate to remote control information, carries out a personal authentication process identifying, by means of personal information, whether or not the requester is an owner of the portable terminal apparatus, and a management device which, in the event that the personal authentication by the authentication device matches the personal information, generates the relevant remote control information for the information security process in the portable terminal apparatus, and carries out a process transmitting the remote control information to the portable terminal apparatus, is described in JP-A-2006-303817.

By this means, by the owner carrying out a remote control using remote control information in response to a theft or loss of the portable terminal apparatus, a given information security process is performed which prevents the owner of the portable terminal apparatus from suffering damage, and it is possible to further increase security relating to information which is property of the owner of the portable terminal apparatus.

SUMMARY

An information processing apparatus disclosed has a communication section operable to communicate with a central apparatus via a communication line, and a storage control section which controls writing onto, and reading from, a storage medium.

The information processing terminal apparatus includes a reception section which receives a control command transmitted from the central apparatus via the communication section.

The information processing terminal apparatus includes a process information acquisition section which, in the event that the control command received is a security command instructing an execution of a security process which disables information stored in the storage medium, acquires process information indicating information relating to the execution of the security process in the storage medium.

The information processing terminal apparatus includes a process information notification section which transmits the process information acquired to the central apparatus via the communication section.

Then information processing terminal apparatus includes a security process execution section which, in the event that the control command received is a security command instructing an execution of the security process, executes the security process in the storage medium; and a process status acquisition section which, in the event that the control command received is an inquiry command inquiring about the status of the execution of the security process by the security process execution section, acquires the status of the execution of the security process by the security process execution section.

The information processing terminal apparatus includes a process status notification section which transmits the security process execution status acquired to the central apparatus via the communication section.

The information processing terminal apparatus includes a process completion notification section which, in the event that the execution of the security process by the security process execution section is completed, transmits the fact that the execution of the security process in the storage medium is completed to the central apparatus.

BRIEF DESCRIPTION OF THE DRAWINGS

FIG. 13 illustrates a data structure of a control SMS;

FIG. 14 illustrates a data structure of an ACK signal;

FIG. 15 illustrates a data structure of a notification SMS (process information);

FIG. 16 illustrates a data structure of a notification SMS (process completed);

DETAILED DESCRIPTION OF THE EMBODIMENTS

Figure 1:
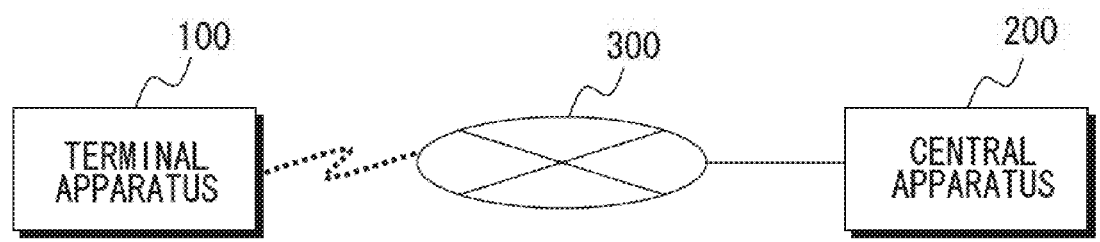
FIG. 1 illustrates a configuration of a system according to embodiment 1.

By carrying out a given information security process using a remote operation on a terminal apparatus which is susceptible to theft or loss, it is possible to reduce by a certain degree the danger of a leak of information from a recording medium included in the terminal apparatus.

However, in conventional technology, there exists a point which should be improved in that it is difficult for a remote operator to confirm that an information security process in a subject terminal apparatus has been accomplished as the remote operator has intended.

Although it is desirable, as the information security process, to delete all information stored on the recording medium included in the terminal apparatus from the recording medium, a time until the information security process in the terminal apparatus is accomplished varies depending on the recording capacity of the recording medium included in the terminal apparatus.

For example, in the case of a terminal apparatus in which is mounted, as the recording medium, an HDD (Hard Disk Drive) which has a recording capacity of several tens of gigabytes, a few minutes are taken in order to delete all the information stored on the recording medium.

As the recording capacity of the recording medium mounted in each terminal apparatus varies, the time to accomplish the information security process in each terminal apparatus which is a subject of the remote operation also varies, making it difficult for the remote operator to ascertain the execution of the information security process in the terminal apparatus.

Also, in a case of executing the information security process in a portable terminal apparatus which operates via a power supply from a storage battery, a problem occurs in that, due to the shortage of the power supply from the storage battery, it is not possible for the terminal apparatus to accomplish the information security process.

Furthermore, a problem occurs in that the remote operator cannot confirm whether or not the terminal apparatus has accomplished the information security process.

With a system disclosed hereafter, the remote operator can accurately and efficiently ascertain the execution of the information security process in the terminal apparatus.

A terminal apparatus disclosed hereafter, being a terminal apparatus having a communication section which can communicate with a central apparatus via a communication line, and a storage control section which controls a writing onto, and reading from, a storage medium, has a reception section which receives a control command transmitted from the central apparatus via the communication section; a process information acquisition section which, in the event that the control command received is a security command instructing an execution of a security process which carries out a deletion of information stored in the storage medium, acquires process information indicating information relating to the execution of the security process in the storage medium; a process information notification section which transmits the process information acquired to the central apparatus via the communication section; a security process execution section which, in the event that the control command received is a security command instructing the deletion of the information stored in the storage medium, executes the security process in the storage medium; a process status acquisition section which, in the event that the control command received is an inquiry command inquiring about the status of the execution of the security process by the security process execution section, acquires the status of the execution of the security process by the security process execution section; a process status notification section which transmits the security process execution status acquired to the central apparatus via the communication section; and a process completion notification section which, in the event that the execution of the security process by the security process execution section is completed, transmits the fact that the execution of the security process in the storage medium is completed to the central apparatus.

According to the above construction, the terminal apparatus, in the event that the control command received from the central apparatus is a security command instructing the execution of the security process, acquires process information indicating information relating to the execution of the security process in the storage medium, and transmits the process information acquired to the central apparatus.

Furthermore, it is also acceptable that the terminal apparatus, in the event that the control command received from the central apparatus is an inquiry command inquiring about the status of the execution of the security process, acquires the status of the execution of the security process, and transmits the security process execution status acquired to the central apparatus.

Furthermore, it is also acceptable that the terminal apparatus, in the event that the execution of the security process is completed, transmits the fact that the security process in the storage medium is completed to the central apparatus.

Hereafter, a description will be given, referring to the drawings, of embodiments of the invention.

Embodiment 1

<<1. Outline of System>>

FIG. 1 illustrates an outline of a security process system according to this embodiment. In FIG. 1, the security process system has a terminal apparatus 100, a central apparatus 200, and a communication network 300.

The communication network 300 illustrated in FIG. 1 being a network such as a so-called carrier network, a wireless access network configured of a base station, local control apparatus, and the like, a core network configured of a mobile exchange, a gateway mobile exchange, a home location register, and the like, a public telephone network, the internet, and the like are included.

The terminal apparatus 100 and central apparatus 200 are mutually connected, and may communicate with each other, via the communication network 300. As the terminal apparatus 100, for example, a PHS terminal, a mobile telephone terminal, a wireless LAN terminal, an information processing terminal such as a personal computer in which is mounted a wireless communication module, or the like, may be used.

<<2. Configuration of Terminal Apparatus>>

Figure 2:
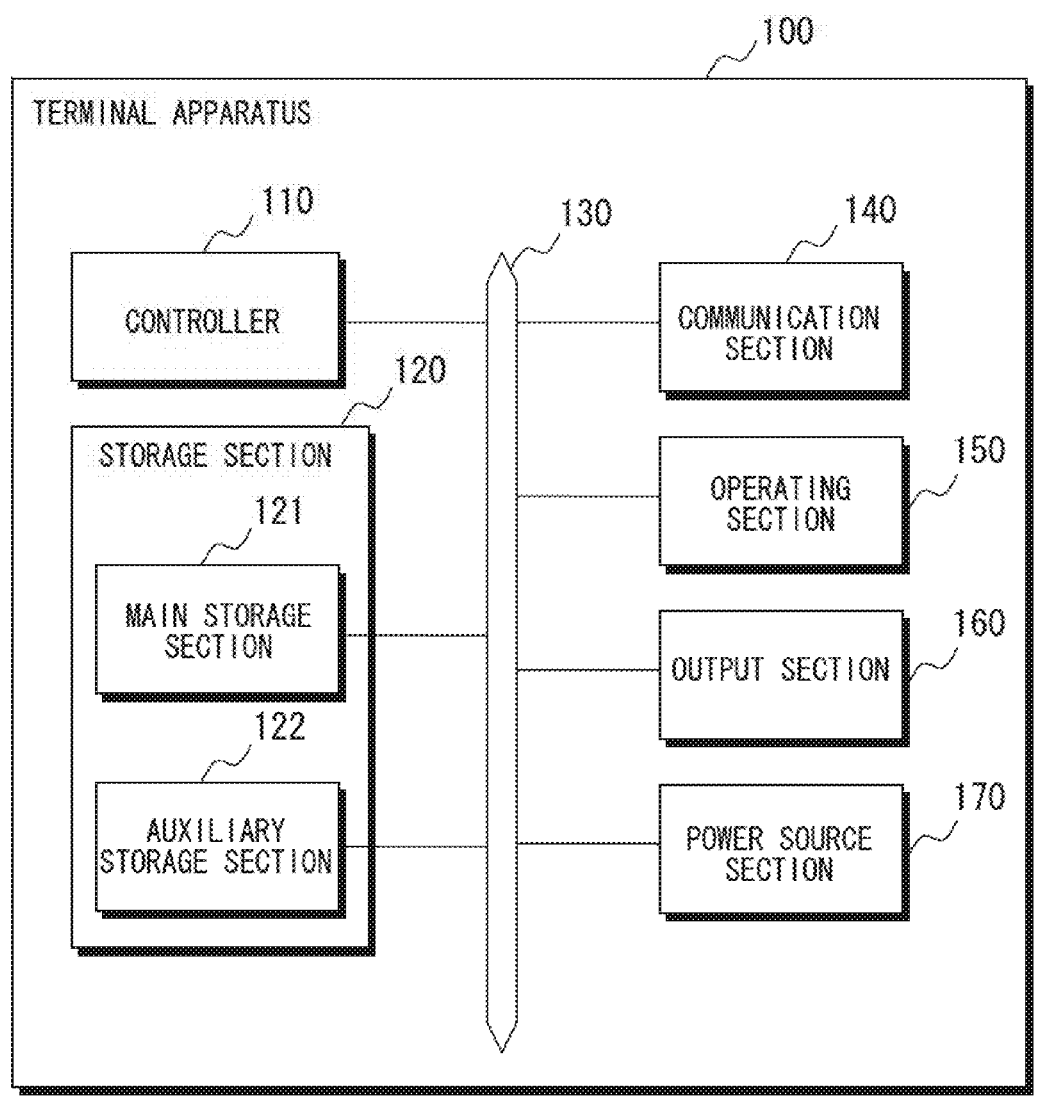
FIG. 2 illustrates a configuration of a terminal apparatus according to embodiment 1.

FIG. 2 illustrates a configuration of the terminal apparatus according to the embodiment. The terminal apparatus illustrated in FIG. 2 has a controller 110, a storage section 120, a communication section 140, an operating section 150, an output section 160, and a power source section 170, and each section is communicably connected via a communication line 130.

The controller 110, being connected via the communication line 130 to each hardware section of the terminal apparatus, realizes a given function in accordance with a procedure of a program stored in the storage section.

As the controller 110, it is possible to use, for example, a central processing unit (CPU), a micro processing unit (MPU), or the like.

The storage section 120 has, for example, a main storage section 121 and an auxiliary storage section 122. A program stored in the auxiliary storage section 122 is loaded into the main storage section 121 by a process of the controller 110 connected via the communication line 130, and an instruction code and data included in the program loaded into the main storage section 121 are forwarded to the controller 110.

As the main storage section 121, it is possible to use, for example, a random access memory (RAM), or a read only memory (ROM).

As the auxiliary storage section 122, it is possible to use, for example, a hard disk drive (HDD), a flash memory, or a solid state drive (SSD).

The communication section 140 is operable to exchange signals with the central apparatus 100 via the communication network 300 using a wired or wireless method.

The operating section 150 is operable to receive an operation by a user.

The operating section 150 is operable to transmit a signal appropriate to the operation by the user to the controller 110 via the communication line 130.

As the operating section 150, it is possible to use, for example, an input button, or a touch panel.

The power source section 170 is operable to receive a supply of power for an operation of the terminal apparatus 100, and is operable to supply the power to each section via a power supply destination (not shown).

Also, the power source section 170 is operable to control the amount of the power supplied to each section via the power supply destination (not shown), through a command from the controller 110 connected via the communication line 130.

In the embodiment, it is acceptable that the power source section 170 is of a configuration such as to receive a supply of power from an external power source, and it is also acceptable that it is of a configuration such as to receive a supply of power from a primary battery or secondary battery mounted in the terminal apparatus 100.

<<3. Components of Terminal Apparatus Program>>

Figure 17:
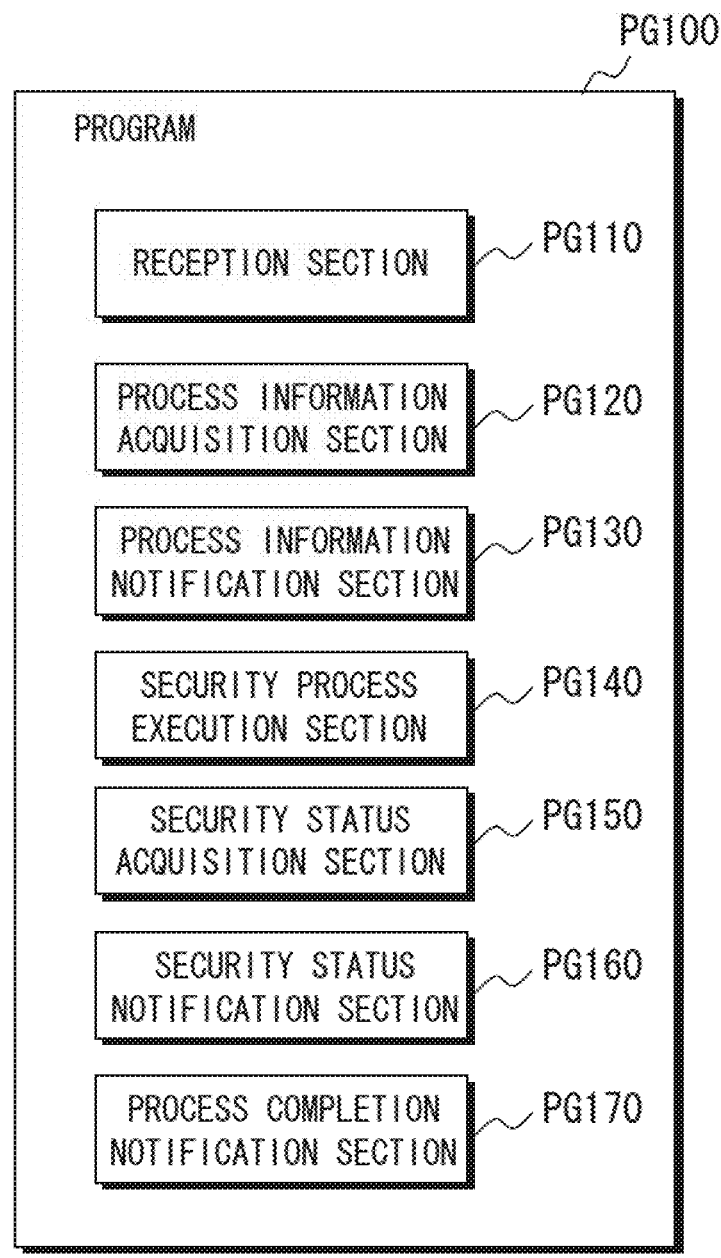
FIG. 17 illustrates components of a program executed in the terminal apparatus according to embodiment 1.

FIG. 17 illustrates components of the program executed in the terminal apparatus according to the embodiment.

The program components illustrated in FIG. 17 include a reception section (PG110), a process information acquisition section (PG120), a process information notification section (PG130), a security process execution section (PG140), a security status acquisition section (PG150), a security status notification section (PG160), and a process completion notification section (PG170).

The reception section (PG110) causes the controller 110 to operate as a component which receives a control command transmitted from the central apparatus 200 via the communication section 140.

The process information acquisition section (PG120) causes the controller 110 to operate as a component which, in the event that the control command received is a security command instructing an execution of a security process which disables information stored in a storage medium included in the terminal apparatus 100, acquires process information indicating information relating to the execution of the security process in the storage medium.

The process information notification section (PG130) causes the controller 110 to operate as a component which transmits the process information acquired to the central apparatus 200 via the communication section 140.

The security process execution section (PG140) causes the controller 110 to operate as a component which, in the event that the control command received is a security command instructing an execution of the security process, executes the security process in the storage medium.

The security status acquisition section (PG150) causes the controller 110 to operate as a component which, in the event that the control command received is an inquiry command inquiring about the status of the execution of the security process by the security process execution section, acquires the status of the execution of the security process by the security process execution section (PG140).

The security status notification section (PG160) causes the controller 110 to operate as a component which transmits the security process execution status acquired to the central apparatus 200 via the communication section 140.

The process completion notification section (PG170) causes the controller 110 to operate as a component which, in the event that the execution of the security process by the security process execution section (PG140) is completed, transmits the fact that the execution of the security process in the storage medium is completed to the central apparatus 200.

<<4. Configuration of Central Apparatus>>

Figure 3:
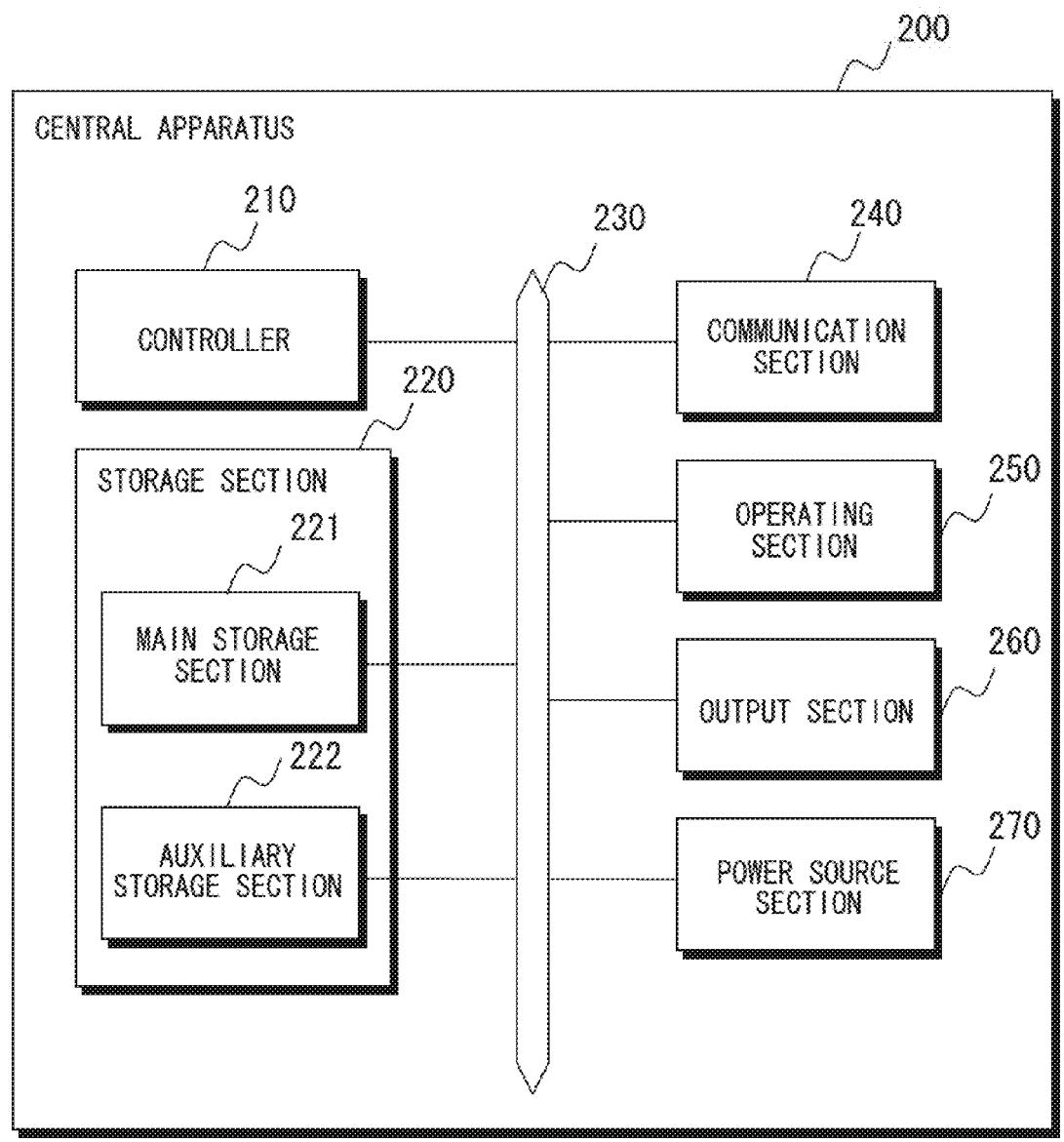
FIG. 3 illustrates a configuration of a central apparatus according to embodiment 1.

FIG. 3 illustrates a hardware configuration of the central apparatus 200 according to the embodiment.

The central apparatus 200 illustrated in FIG. 3 including a controller 210, a storage section 220, a communication section 240, an operating section 250, an output section 260, and a power source section 270, each section is communicably connected via a communication line 230.

The controller 210, being connected via the communication line 230 to each hardware section of the central apparatus, realizes a given function in accordance with a procedure of a program stored in the storage section 220.

As the controller 210, it is possible to use, for example, a central processing unit (CPU), a micro processing unit (MPU), or the like.

As other configurations of the central apparatus 200 are configurations identical to those of a general personal computer or the like, a detailed description will be omitted.

<<5. Components of Central Apparatus Program>>

Figure 20:
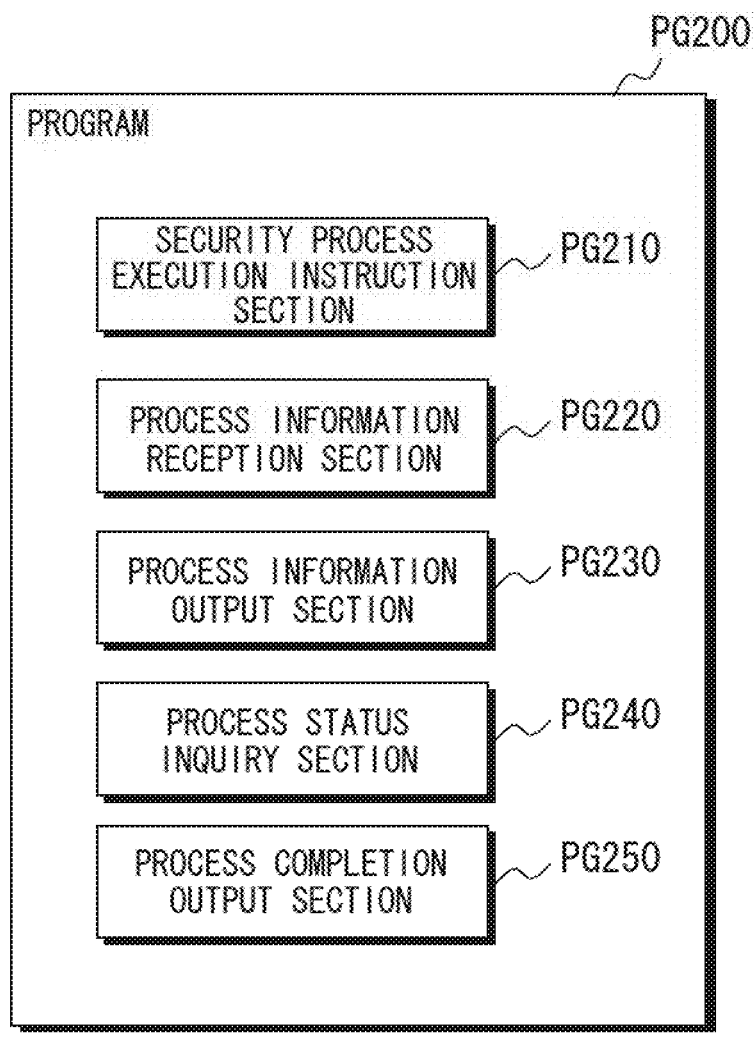
FIG. 20 illustrates components of a program executed in the central apparatus.

FIG. 20 illustrates components of the program executed in the central apparatus according to the embodiment.

The program components illustrated in FIG. 20 include a security process execution instruction section (PG210), a process information reception section (PG220), a process information output section (PG230), a process status inquiry section (PG240), and a process completion output section (PG250).

The security process execution instruction section (PG210) causes the controller 210 to operate as a component which transmits a control short message service (SMS) to the terminal apparatus 100, via the communication section 240, instructing an execution of the security process in the terminal apparatus.

The process information reception section (PG220) causes the controller 210 to operate as a component which receives from the terminal apparatus 100, via the communication section 240, a notification SMS including process information indicating information relating to the execution of the security process in the terminal apparatus 100.

The process information output section (PG230) causes the controller 210 to operate as a component which causes the output section 260 to output the process information received.

The process status inquiry section (PG240) causes the controller 210 to operate as a component which transmits to the terminal apparatus 100, via the communication section 240, a control SMS causing the terminal apparatus 100 to transmit process information indicating the status of the execution of the security process in the terminal apparatus 100.

The process completion output section (PG250) causes the controller 210 to operate as a component which, in the event of receiving from the terminal apparatus 100, via the communication section 240, a notification of the fact that the execution of the security process in the terminal apparatus 100 is completed, causes the output section 260 to output the fact that the execution of the security process is completed.

<<6. Flow of Communication Process of System as a Whole (FIG. 4)>>

Figure 4:
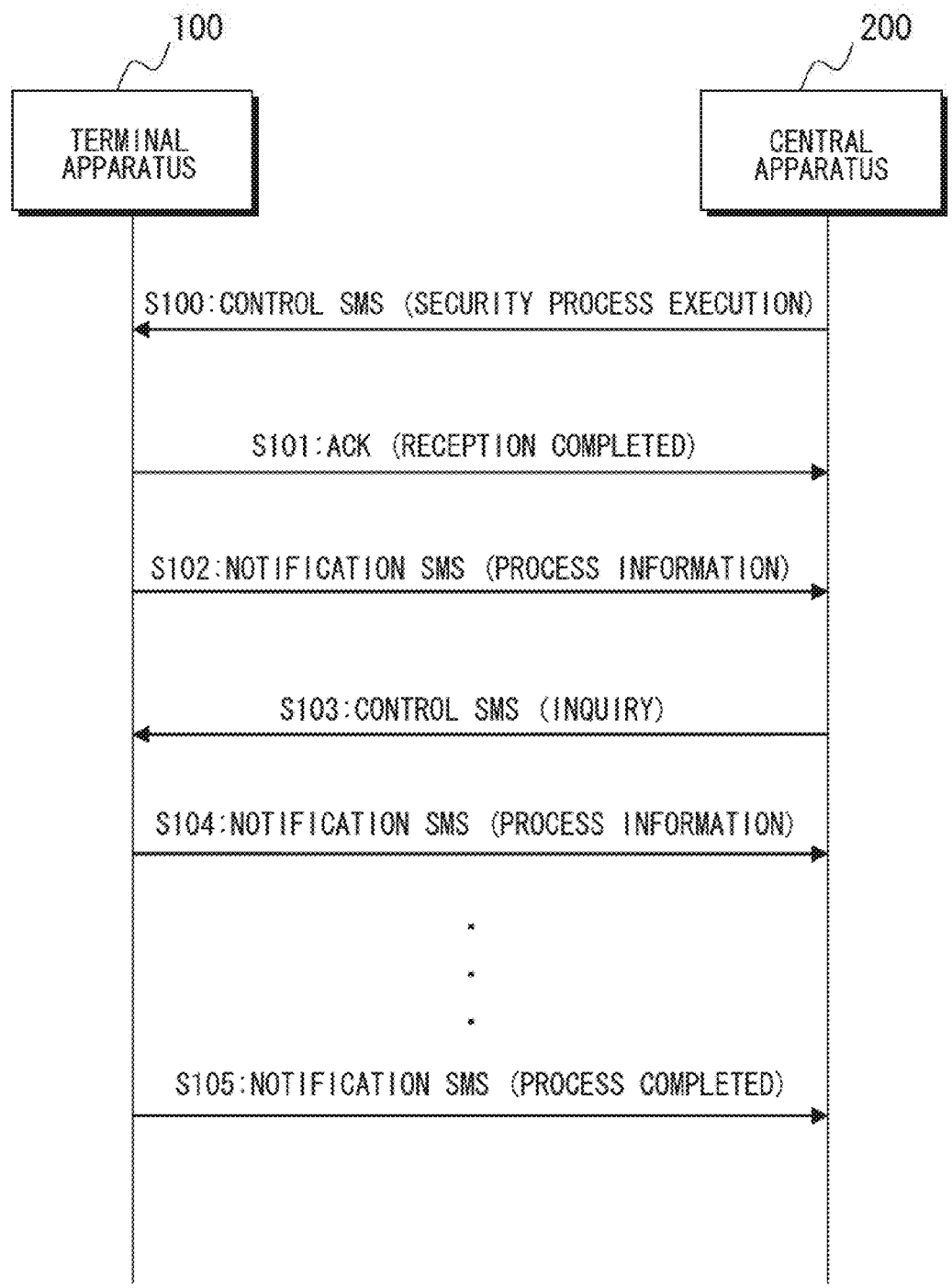
FIG. 4 illustrates a flow of a communication process between the terminal apparatus and central apparatus according to embodiment 1.

FIG. 4 is a diagram illustrating a flow of a communication process carried out, via the communication network 300, between the terminal apparatus 100 and central apparatus 200 according to the embodiment.

Firstly, the central apparatus 200 transmits a control SMS, including an instruction code instructing an execution of the security process, to the terminal apparatus 100 (S100).

Figure 13:
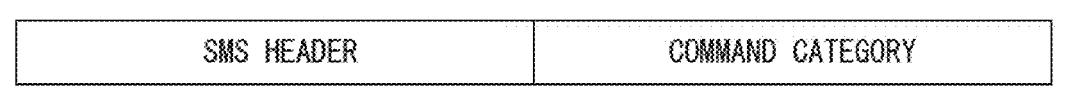

FIG. 13 illustrates a data structure of the control SMS.

The control SMS includes an SMS header indicating information identifying the terminal apparatus to which the transmission is made, and the like, and a command category indicating the category of a command.

The control SMS transmission process is executed, for example, by an operator of the central apparatus 200 who receives a communication from the user of the terminal apparatus 100 of the fact that the terminal apparatus 100 has been lost, and who receives from the user a request for an execution of a security process in order to prevent a leak of information from the recording medium included in the lost terminal apparatus 100.

The terminal apparatus 100 receives the control SMS from the central apparatus 200 via the communication network 300, and transmits an ACK signal, including a code of the fact that the reception of the control SMS is completed, to the central apparatus 200 (S101).

Figure 14:
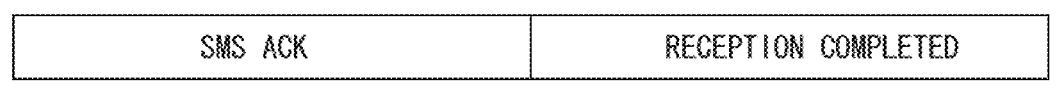

FIG. 14 illustrates a data structure of the ACK signal.

The ACK signal includes an "SMS ACK" code indicating information for identifying the terminal apparatus 100 from which the transmission is made, and indicating that the signal is an ACK, and includes a "reception complete" code indicating that the reception is completed.

The terminal apparatus 100, furthermore, based on information on a hardware configuration of its own terminal apparatus, and on an operational state, acquires information indicating operating conditions relating to the security process, and transmits a notification SMS, including process information acquired based on the acquired information indicating the operating conditions relating to the security process, to the central apparatus 200 (S102).

Figure 15:
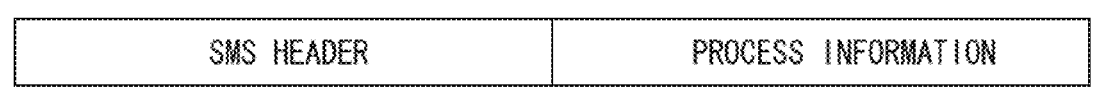

FIG. 15 illustrates a data structure of the notification SMS.

The notification SMS includes an SMS header indicating information identifying the terminal apparatus from which the transmission is made, and the process information.

For example, the terminal apparatus transmits the notification SMS with information on a hardware structure such as the storage capacity of the auxiliary storage section 122 which is the subject of the security process, and the model number of the auxiliary storage section 122, as the process information.

According to the process described above, the central apparatus 200 can acquire the information relating to the configuration of the hardware of the terminal apparatus 100 which is the subject of the security process, and ascertain the execution status of the security process executed in the terminal apparatus 100.

That is, it is possible, based on information relating to the hardware configuration which is the subject of the security process, to ascertain a theoretical time from a start of the execution of the security process until a completion of the execution.

The shorter the time until the completion of the execution of the security process, the less the danger of information leaking from the recording medium of the terminal apparatus 100, meaning that it is important for the operator of the central apparatus 200 to ascertain an estimate of the time until the completion of the execution of the security process, in order to notify the user who has requested the execution of the security process.

In process S102, it is also acceptable that the terminal apparatus 100, based on the information relating to the hardware configuration, acquires a predicted time indicating the theoretical time from the start of the execution of the security process until the completion of the execution, and transmits the notification SMS to the central apparatus 200 with the acquired predicted time as the process information.

The central apparatus 200 receives the notification SMS from the terminal apparatus (S102) and, based on the process information included in the notification SMS, outputs information relating to an operation of the security process in the terminal apparatus 100.

The central apparatus 200 transmits a control SMS, including a code indicating an inquiry about the execution status of the security process in the terminal apparatus 100, to the terminal apparatus 100 (S103).

The terminal apparatus 100 receives the control SMS from the central apparatus 200, and acquires process information indicating the progress of the execution of the security process.

For example, the terminal apparatus 100 measures the time elapsed from starting a physical formatting process in the auxiliary storage section which is the subject of the security process until the present time, and acquires the measured elapsed time as the process information.

Also, the terminal apparatus 100 may also measure the storage capacity of an area in which is executed the physical formatting process in the auxiliary storage section which is the subject of the security process, and acquire the storage capacity obtained by measuring as the process information.

The terminal apparatus 100 transmits a notification SMS, including the acquired process information, to the central apparatus 200 (S104).

The central apparatus 200 receives the notification SMS from the terminal apparatus 100 (S104) and, based on the process information included in the notification SMS, outputs the execution status of the security process in the terminal apparatus 100.

The central apparatus 200, furthermore, determines whether or not the process information included in the notification SMS received from the terminal apparatus 100 indicates the completion of the security process and, in the event that it does not indicate the completion of the security process, executes process S103 after an appropriate time has elapsed.

The terminal apparatus 100, in the event that the execution of the security process is completed, transmits a notification SMS, including a code indicating the completion of the execution of the security process, to the central apparatus 200 (S105).

The central apparatus 200, on receiving from the terminal apparatus 100 the notification SMS including the code indicating the completion of the execution of the security process, outputs the fact that the execution of the security process in the terminal apparatus 100 is completed.

Figure 16:
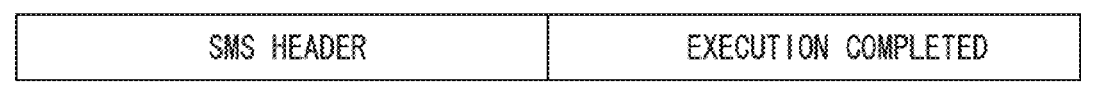

FIG. 16 illustrates a data structure of a notification SMS indicating the fact that the execution of the security process is completed.

The notification SMS indicating the fact that the execution of the security process is completed includes an SMS header indicating information identifying the terminal apparatus 100 which has made the transmission, and an "execution completed" code indicating the fact that the execution of the security process is completed.

Through the process described above, the operator of the central apparatus 200 can ascertain that the execution of the security process in the terminal apparatus 100 is completed.

After the execution of the security process is completed, as the state of the terminal apparatus is such that no information which is the subject of the security process is stored on the recording medium of the terminal apparatus 100, it is possible to prevent information leaking from the recording medium of the terminal apparatus 100.

For this reason, it is important for the operator of the central apparatus 200 to ascertain that the execution of the security process is completed, in order to notify the user who has requested the execution of the security process.

<<7. Flow of Security Process in Central Apparatus>>

Figure 11:
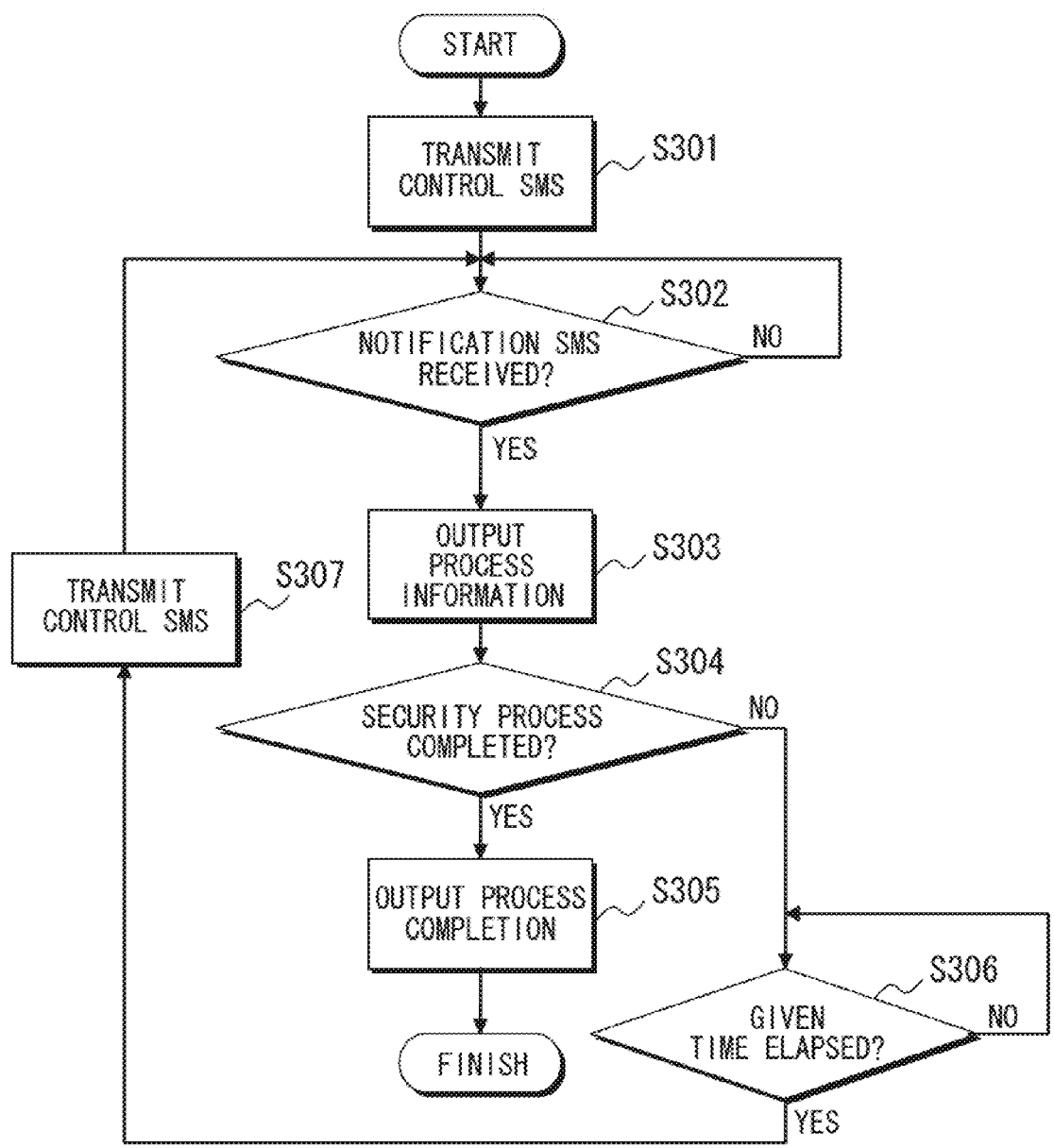
FIG. 11 illustrates a flow of a security process in the central apparatus.

FIG. 11 illustrates a flow of the security process in the central apparatus 200 according to the embodiment.

Firstly, the controller 210 of the central apparatus 200 transmits a control SMS, including a security command indicating a security process execution instruction, via the communication section 240 to the terminal apparatus 100 which is the subject of the security process (S301).

Subsequently, the controller 210 receives an ACK signal, indicating the fact that the control SMS has been received, from the terminal apparatus 100.

In the control SMS, it is possible to include authentication information for causing the legitimacy of the security command to be confirmed in the terminal apparatus.

The controller 210, when transmitting the control SMS, may acquire, via the operating section 250, information identifying the terminal apparatus 100 which is the subject of the security process.

Figure 21:
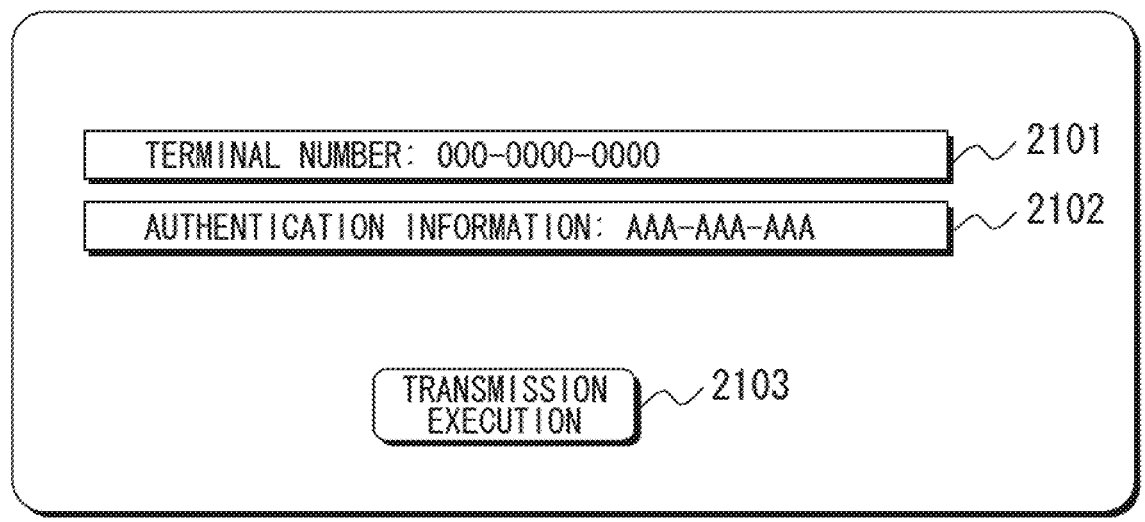
FIG. 21 illustrates an example of output details in the central apparatus.

For example, the controller 210 may display an input screen including, as a component, the output example illustrated in FIG. 21 via the output section 260, and acquire an input via the operating section 250.

The output example of input screen illustrated in FIG. 21 includes a terminal number input field 2101, an authentication information input field 2102, and a transmission execution button 2103.

The terminal number input field 2101 is operable to receive an input of a terminal number as information identifying the terminal apparatus 100 which is the subject of a transmission.

In the example illustrated in FIG. 21, "000-0000-0000" is input as the terminal number.

The authentication information input field 2102 is operable to receive an input of authentication information indicating information used when confirming the legitimacy of the security command in the terminal apparatus 100 which is the subject of the transmission.

In the example illustrated in FIG. 21, "AAA-AAA-AAA" is input as the authentication information.

The transmission execution button 2103 is operable to receive an input of an instruction causing the controller 210 to execute a control SMS transmission process.

Next, the controller 210 determines whether or not it has received a notification SMS from the terminal apparatus 100 (S302) and, if the controller 210 has received a notification SMS from the terminal apparatus 100 via the communication section 240 (S302: Yes), the controller 210 displays, via the output section 260, process information included in the notification SMS received (S303).

Figure 12:
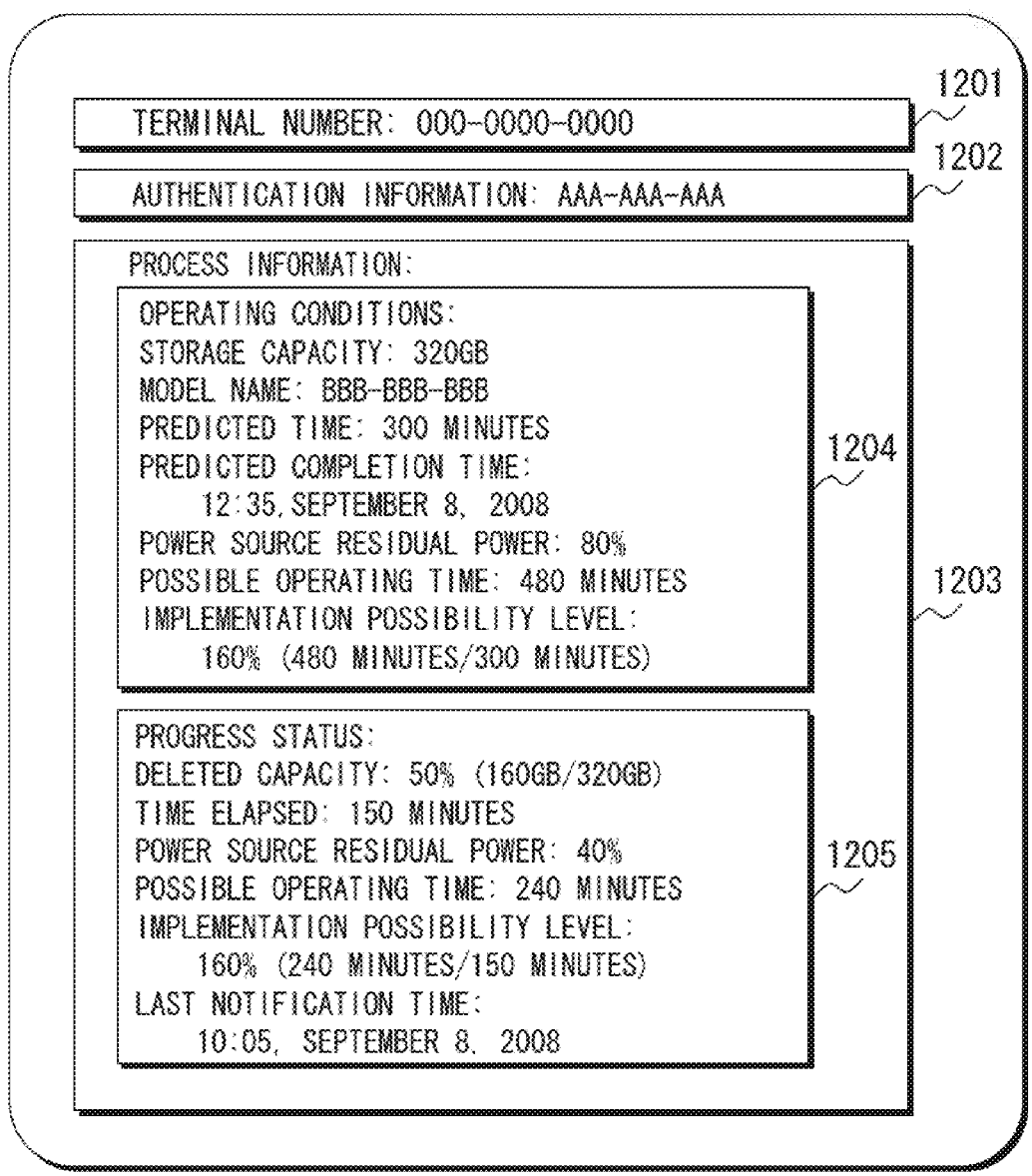
FIG. 12 illustrates an example of output details in the central apparatus.

FIG. 12 illustrates an example of contents of a screen displayed in process S303.

The screen example illustrated in FIG. 12 includes a terminal number display field 1201, an authentication information display field 1202, and a process information display field 1203.

Furthermore, the process information display field 1203 includes an operating condition display field 1204, and a progress status display field 1205.

A terminal number is displayed in the terminal number display field 1201 as information identifying the terminal apparatus 100 to which the control SMS is transmitted in the process S301 described above.

For example, the terminal number of which an input is received on the input screen illustrated in FIG. 21 is displayed in the display field 1201.

In the example illustrated in FIG. 12, "000-0000-0000" is displayed as the terminal number in the display field 1201.

The authentication information included in the control SMS in process S301 is displayed in the authentication information display field 1202.

For example, the authentication information of which an input is received on the input screen illustrated in FIG. 21 is displayed in the display field 1202.

In the example illustrated in FIG. 12, "AAA-AAA-AAA" is displayed as the authentication information in the display field 1202.

Output details, generated based on the process information included in the notification SMS received via the communication section 204 from the terminal apparatus 100, are displayed in the process information display field 1203.

In the example illustrated in FIG. 12, based on the process information, "Storage capacity: 320 GB", "Model name: BBB-BBB-BBB", "Predicted time: 300 minutes", "Predicted completion time: 12:35, Sep. 8, 2008", "Power source residual power: 80%", "Possible operating time: 480 minutes", and "Implementation possibility level: 160% (480 minutes/300 minutes)" are displayed as the operating conditions in the display field 1204.

The storage capacity illustrated in the display field 1204 indicates the storage capacity of the recording medium which is the subject of the security process in the terminal apparatus 100.

In the example illustrated in FIG. 12, it is illustrated that the storage capacity of the recording medium which is the subject of the security process is 320 gigabytes (GB).

The model name illustrated in the display field 1204 indicates the model name of the recording medium which is the subject of the security process in the terminal apparatus 100.

In the example illustrated in FIG. 12, it is illustrated that the model name of the recording medium which is the subject of the security process is "BBB-BBB-BBB".

The predicted time illustrated in the display field 1204 indicates a theoretical time for the execution of the security process in the terminal apparatus 100.

In the example illustrated in FIG. 12, it is illustrated that the predicted time is "300 minutes".

The predicted completion time illustrated in the display field 1204 indicates a time predicted as a time at which the execution of the security process in the terminal apparatus 100 will be completed.

For example, by adding the figure illustrated in the heretofore described predicted time to a transmission time indicated in the SMS header included in the notification SMS, it is possible to obtain time information to display as the predicted completion time.

In the example illustrated in FIG. 12, it is illustrated that the predicted completion time is "12:35, Sep. 8, 2008".

The power source residual power illustrated in the display field 1204 illustrates the value of the power source residual power detected in the terminal apparatus 100 when executing the security process.

In the example illustrated in FIG. 12, it is illustrated that the power source residual power is "80%".

That is, in the example illustrated in FIG. 12, it is illustrated that, 20% of the maximum capacity of a power source connected to the terminal apparatus 100 having already been consumed, 80% of the maximum capacity of the power source can be utilized.

The possible operating time illustrated in the display field 1204 indicates an operating time for which the execution of the security process in the terminal apparatus 100 is possible, based on the heretofore described power source residual power.

For example, by dividing the heretofore described residual power by the power consumption per unit time when executing the security process in the terminal apparatus 100, it is possible to acquire time information to display as the possible operating time.

In the example illustrated in FIG. 12, it is illustrated that the possible operating time is "480 minutes".

The implementation possibility level illustrated in the display field 1204 indicates a percentage of the heretofore described possible operating time taken up by the heretofore described predicted time.

That is, the implementation possibility level indicates a level regarding an extent to which the security process will be executed, based on the power source residual power detected in the terminal apparatus 100.

In the example illustrated in FIG. 12, the expression "480 minutes/300 minutes", in which the possible operating time is divided by the predicted time, is illustrated as verification of the fact that the implementation possibility level is "160%".

Of the process information, a description of the progress status display field 1205 will be given hereafter.

Next, the controller 210 determines whether or not the notification SMS received via the communication section 240 in process S302 indicates the completion of the execution (S304) and, if it is a notification SMS indicating the completion of the execution (S304: Yes), causes the output section 260 to display the fact (S305), and finishes the security process according to the embodiment.

Meanwhile, if it determines in process S304 that the notification SMS does not indicate the completion of the execution (S304: No), the controller 210, after a given time has elapsed (S306: Yes), transmits a control SMS to the terminal apparatus 100, via the communication section 240, including a command causing the terminal apparatus 100 to transmit a notification SMS indicating the execution status of the security process (S307).

Subsequently, the controller 210 executes the process procedures from process S302.

That is, the controller 210, after transmitting the control SMS in process S307, causes the output section 260 to display output details generated based on the process information included in the notification SMS received via the communication section 204 from the terminal apparatus.

In the example illustrated in FIG. 12, based on the process information, "Deleted capacity: 50% (160 GB/320 GB)", "Time elapsed: 150 minutes", "Power source residual power: 40%", "Possible operating time: 240 minutes", "Implementation possibility level: 160% (240 minutes/150 minutes)", and "Last notification time: 10:05, Sep. 8, 2008" are displayed as the progress status in the display field 1205.

The deleted capacity illustrated in the display field 1205 indicates a storage capacity of the recording medium deleted by the security process in the terminal apparatus 100.

In the example illustrated in FIG. 12, "160 GB" is illustrated as the deleted capacity, "320 GB" is illustrated as the whole storage capacity of the recording medium, and "50%" is illustrated as a percentage of the storage capacity deleted with respect to the whole storage capacity.

The time elapsed illustrated in the display field 1205 indicates a time elapsed from the starting time of the execution of the security process in the terminal apparatus 100.

In the example illustrated in FIG. 12, "150 minutes" is illustrated as the time elapsed.

The power source residual power illustrated in the display field 1205 indicates the power source residual power detected in the terminal apparatus 100 when transmitting the notification SMS.

In the example illustrated in FIG. 12, "40%" is illustrated as the power source residual power.

That is, in the example illustrated in FIG. 12, it is illustrated that, 60% of the maximum capacity of the power source connected to the terminal apparatus 100 having already been consumed, 40% of the maximum capacity of the power source can be utilized.

The possible operating time illustrated in the display field 1205 indicates an operating time for which the execution of the security process in the terminal apparatus 100 is possible, based on the heretofore described power source residual power illustrated in the display field 1205.

For example, by dividing the heretofore described power source residual power illustrated in the display field 1205 by the power consumption per unit time when executing the security process in the terminal apparatus 100, it is possible to acquire time information to display as the possible operating time.

In the example illustrated in FIG. 12, "240 minutes" is illustrated in the display field 1205 as the possible operating time.

The implementation possibility level illustrated in the display field 1205 indicates a percentage of the heretofore described possible operating time illustrated in the display field 1205 taken up by the remaining predicted time.

That is, the implementation possibility level indicates a level regarding an extent to which the security process will be executed in the terminal apparatus 100, based on the power source residual power detected in the terminal apparatus 100.

In the example illustrated in FIG. 12, the expression "240 minutes/150 minutes", in which the possible operating time is divided by the remaining predicted time, is illustrated in the display field 1205 as verification of the fact that the implementation possibility level is "160%".

The remaining predicted time may be acquired by subtracting the heretofore described time elapsed illustrated in the display field 1205 from the heretofore described predicted time illustrated in the display field 1204.

The last notification time illustrated in the display field 1205 indicates the transmission time illustrated in the SMS header included in the notification SMS received via the communication section 240 from the terminal apparatus 100.

In the example illustrated in FIG. 12, "10:05, Sep. 8, 2008" is illustrated as the last notification time.

<<8. Flow of Security Process in Terminal Apparatus>>

Figure 5:
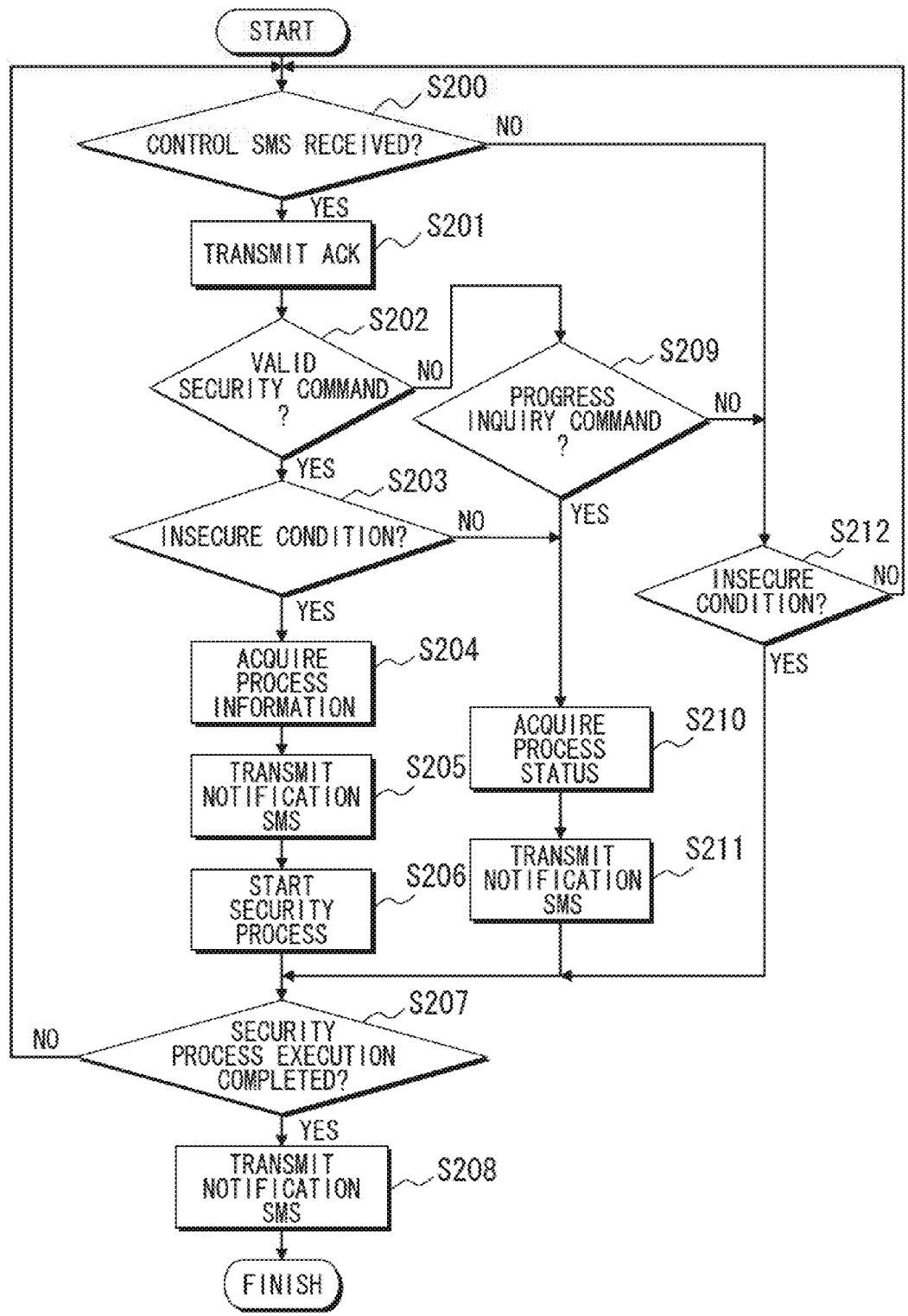
FIG. 5 illustrates a flow of a security process in the terminal apparatus according to embodiment 1.

FIG. 5 illustrates a flow of the security process in the terminal apparatus 100 according to the embodiment.

Firstly, the controller 110 of the terminal apparatus 100 waits to receive a command indicating a security process execution instruction, or the like (S200).

That is, the controller 110 determines whether or not it has received a control SMS from the central apparatus 200 (S200).

If it is determined that the controller 110 has received a control SMS from the central apparatus 200 (S200: Yes), the controller 110 transmits an ACK signal indicating the fact that the controller 110 has received the control SMS to the central apparatus 200, via the communication section 140.

Meanwhile, if it is determined that the controller 110 has not received a control SMS from the central apparatus 200 (S200: No), the controller 110 determines whether or not the terminal apparatus 100 is in a secure condition (S212).

If it is determined that the operational state of the terminal apparatus 100 is not in a secure condition (S212: No), the controller 110 executes the process procedures again from process S220.

That is, in the case of an operational state in which the security process has not been executed in the terminal apparatus 100, the controller 110 repeatedly executes processes S200 and S212 at an appropriate timing.

The controller 110, after transmitting the ACK signal to the central apparatus 200 in the above process, furthermore determines whether or not the command included in the control SMS received is a valid security command (S202).

For example, the controller 110 may compare identification information included in the SMS received from the central apparatus 200 with identification information stored in advance in the terminal apparatus 100 and, based on the result of determining whether or not they match, determine the validity thereof.

If it is determined that the command is a valid security command (S202: Yes), the controller 110 acquires the operational state of the terminal apparatus 100, and determines whether or not the operational state is in a secure condition wherein the security process has already been executed (S203).

If it is determined that the operational state of the terminal apparatus 100 is in an insecure state (S203: Yes), the controller 110 acquires the process information of the terminal apparatus 100 (S204), and transmits a notification SMS including the acquired process information to the central apparatus 200 (S205).

For example, the controller 110 may acquire hardware information, such as the storage capacity and model number of the auxiliary storage section 122 included in the terminal apparatus 100, as the operating conditions of the security process, and take the acquired hardware information as the process information.

It is also acceptable to configure in such a way that the hardware information such as the storage capacity and model number of the auxiliary storage section 122 is stored in advance in a registry included inside the auxiliary storage section 122, and the controller 110 acquires the hardware information by referring to the registry included inside the auxiliary storage section 122 via the communication line 130.

Alternatively, it is also acceptable that the controller 110, based on the acquired hardware information, acquires, as the process information, a predicted time indicating a theoretical value of a process time for the operation of the security process.

It is possible, for example, based on a response speed of the auxiliary storage section and the storage capacity of the auxiliary storage section, to acquire a theoretical value of a process time for the operation from the start of the execution until the completion of the execution of the physical formatting of the auxiliary storage section.

It is acceptable that the response speed of the auxiliary storage section 122 is acquired as the heretofore described hardware information stored in the registry included inside the auxiliary storage section 122, and it is also acceptable that the response speed is acquired by measuring a writing speed per unit time (e.g., the size of data stored per unit time), or the like, when executing a process of writing onto the auxiliary storage section 122, or the like.

Next, the controller 110 starts the security process (S206).

For example, the controller 110 starts the process of the physical formatting of the auxiliary storage section 122, shifting the operational state of the terminal apparatus 100 to a secure state.

A secure state means, for example, a condition which disables an input of a signal from the operating section 150 of the terminal apparatus 100.

Meanwhile, if the controller 110 determines, in process S202, that the command included in the control SMS received is not a valid security command (S202: No), the controller 110 determines whether or not the command received is a progress inquiry command (S209).

If it is determined that the command is a progress inquiry command (S209: Yes), the controller 110 acquires the execution status of the security process (S210), takes the acquired process status as the process information, and transmits a notification SMS to the central apparatus 200 (S211).

If it is determined, in process S203, that the operational state of the terminal apparatus 100 is not in an insecure condition (S203: No), the controller 110 executes processes S210 and S211.

This is a measure for, when a control SMS including a command indicating a security process execution instruction, which has been received previously, is received again, causing the transmission of the progress inquiry command from the central apparatus 200 to be dispensed with, not only by notifying of the fact that the security process is already being executed, but also by notifying the central apparatus 200 of the process execution progress status.

Through the process described above, it is possible to achieve a greater efficiency of the communication process carried out between the central apparatus 200 and the terminal apparatus 100.

The controller 110, after executing process S206 or S211, or after determining in the process S212 that the operational state of the terminal apparatus 100 is in a secure condition, determines whether or not the execution of the security process is completed (S207).

If it is determined that the execution of the security process is completed (S207: Yes), the controller 110 transmits a notification SMS, including a code indicating a result of the security process, to the central apparatus 200 (S208).

Meanwhile, if it is determined that the execution of the security process is not completed (S207: No), the controller 110 executes the process procedures again from process S200.

That is, if the controller 110 determines in process S200 that no control SMS has been received (S200: No), the controller 110 determines in process S212 that the operational state of the terminal apparatus 100 is in a secure condition (S212: Yes), and executes the determination process of process S207.

If it is determined in process S209 that the command is not a progress inquiry command (S209: No), the determination process in process S212 is executed.

That is, in the event that it is determined that the command included in the control SMS received is not a command relating to the security process according to the embodiment, the same process is executed as in the case in which it is determined in process S200 that no control SMS has been received.

Embodiment 2

<<1. Outline of System>>

As the configuration of the system according to this embodiment is the same as that of the heretofore described embodiment 1, a description will be omitted.

<<2. Configuration of Terminal Apparatus>>

Figure 6:
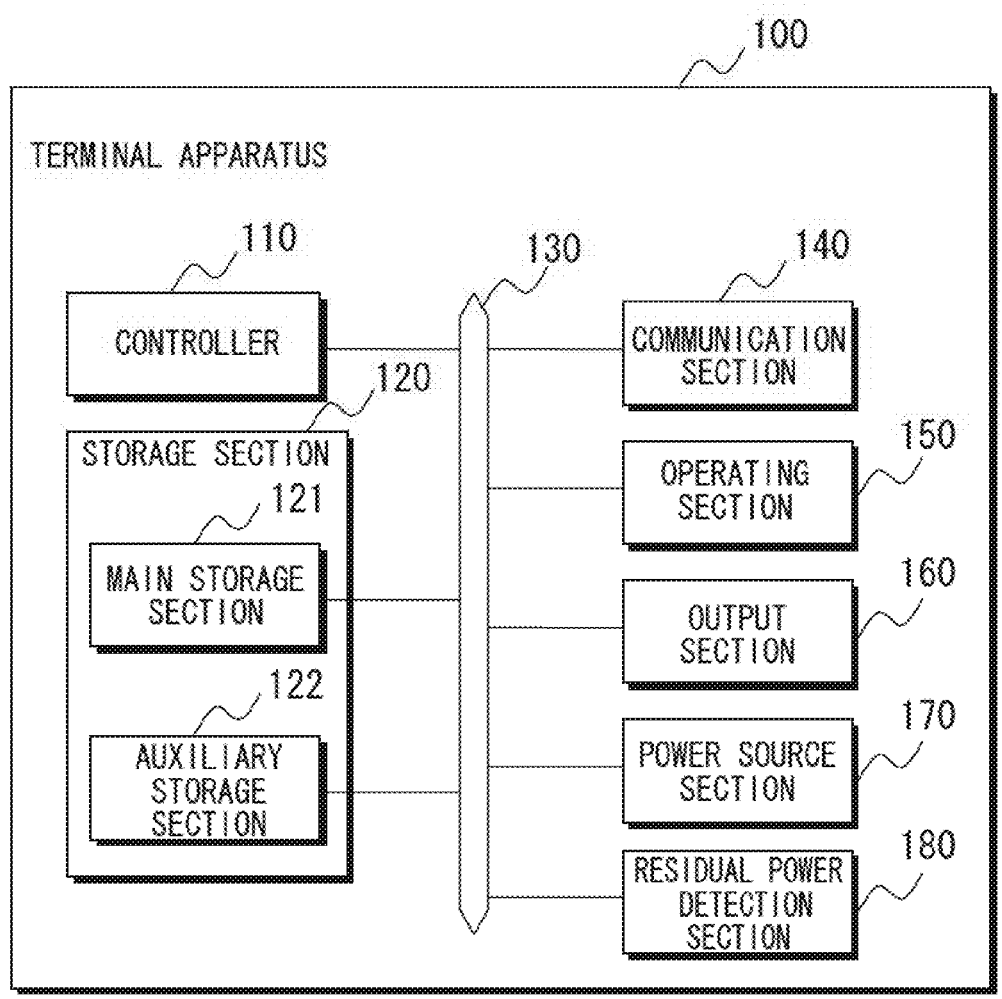
FIG. 6 illustrates a configuration of a terminal apparatus according to embodiment 2.

FIG. 6 illustrates a configuration of a terminal apparatus according to the embodiment.

The terminal apparatus illustrated in FIG. 6 includes, apart from the hardware configuration illustrated in embodiment 1, a residual power detection section 180.

The power source section 170 in the embodiment is operable to receive a supply of power for an operation of the terminal apparatus 100 from a primary battery or secondary battery connected to the terminal apparatus.

The residual power detection section 180 is operable to detect a residual power of the primary battery or secondary battery supplying power to the power source section 170, and is operable to forward the detected residual power to the controller 110 via the communication line 130.

As other configurations are the same as the hardware configuration illustrated in embodiment 1, a description will be omitted.

<<3. Configuration of Terminal Apparatus Program>>

Figure 18:
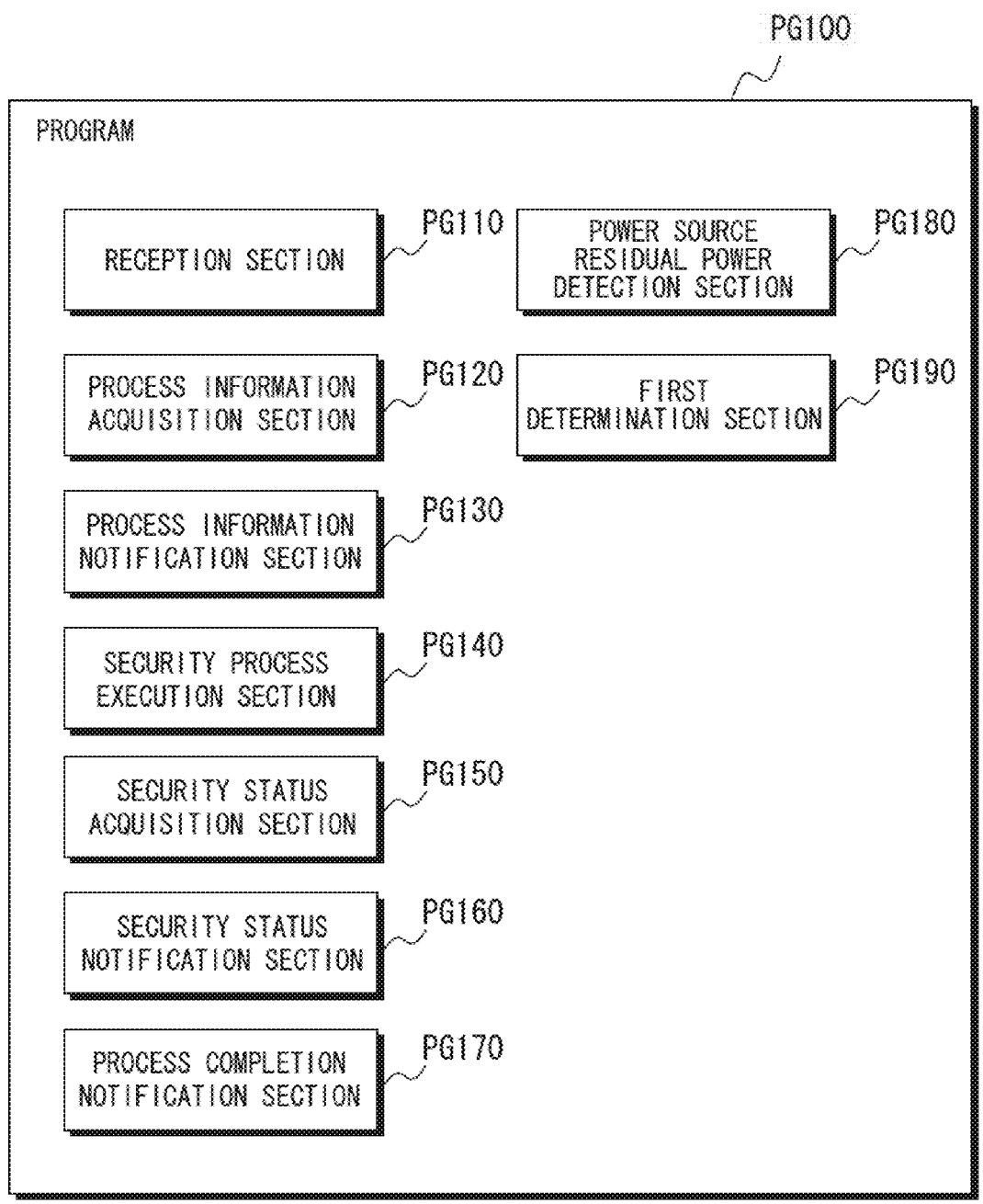
FIG. 18 illustrates components of a program executed in the terminal apparatus according to embodiment 2.

FIG. 18 illustrates components of the program executed in the terminal apparatus according to the embodiment.

The program components illustrated in FIG. 18 with configurations identical to those of the program components illustrated in the heretofore described embodiment 1 (FIG. 17) are given identical reference letters and numerals.

The program components illustrated in FIG. 18 differ from the program components of embodiment 1 illustrated in FIG. 17 in that, for example, a power source residual power detection section (PG180) and a first determination section (PG190) are added.

The power source residual power detection section (PG180) added in this embodiment causes the controller 110 to operate as a component which acquires the residual power detected by the residual power detection section 180, which detects the residual power of the primary battery or secondary battery supplying power to the power source section 170.

Also, the first determination section (PG190) causes the controller 110 to operate as a component which compares the power source residual power detected by the power source residual power detection section with a first threshold value, and determines whether or not the power source residual power exceeds the first threshold value.

Herein, the first threshold value may, for example, be set in correlation to the power consumed in the terminal apparatus when transmitting the security process execution status to the central apparatus 200, via the communication section 140, using the heretofore described security status notification section (PG160).

As other configurations are the same as those of the heretofore described embodiment 1, a description will be omitted.

<<4. Flow of Communication Process of System as a Whole>>

Figure 7:
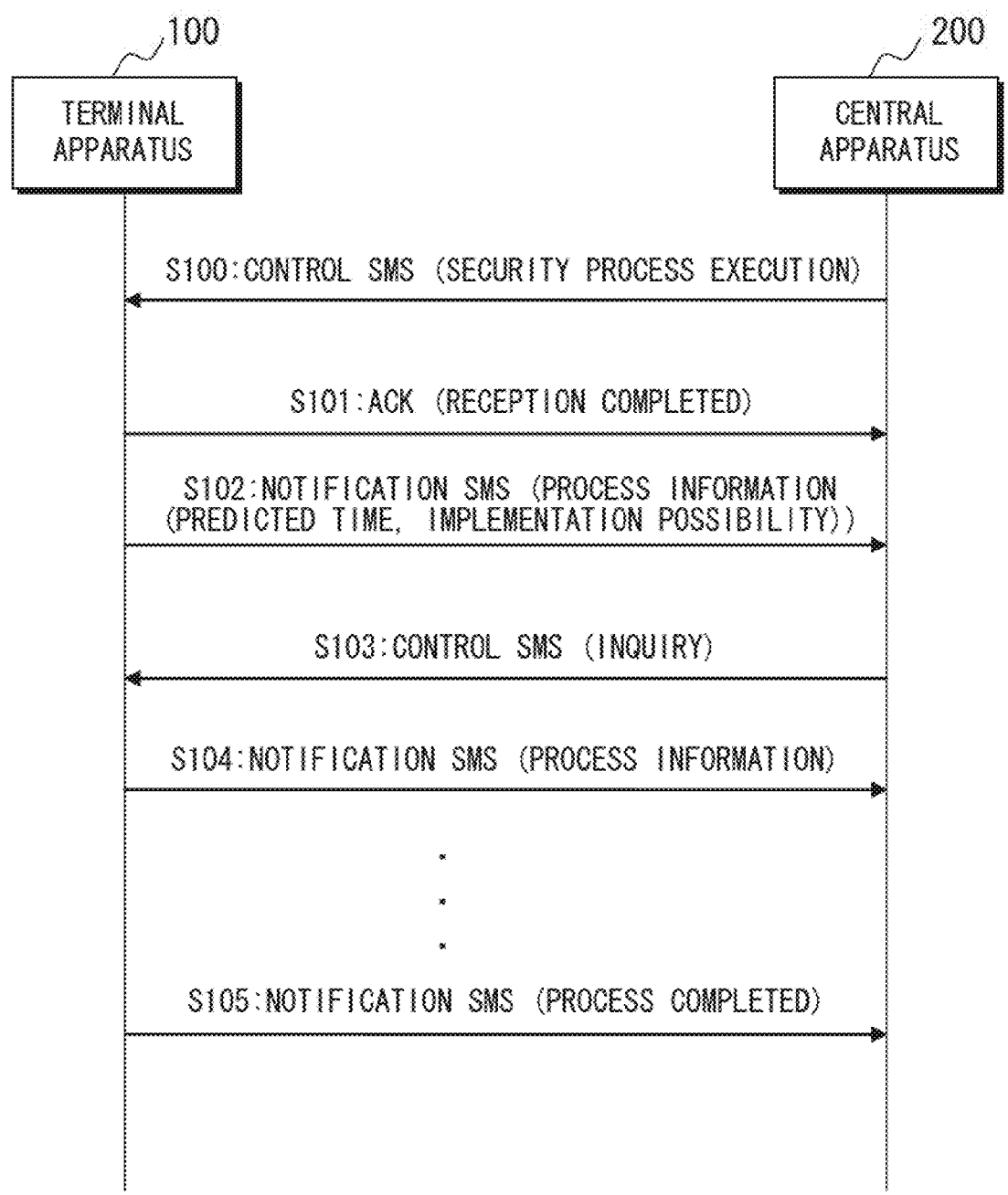
FIG. 7 illustrates a flow of a communication process between the terminal apparatus and central apparatus according to embodiment 2.

FIG. 7 illustrates a flow of a communication process carried out, via a communication line and a relay device, between the terminal apparatus and central apparatus according to the embodiment.

The flow of the communication process illustrated in FIG. 7 differs from the flow of the communication process illustrated in embodiment 1 in that, in process S102, the residual power detected by the residual power detection section 180 as the process information included in the notification SMS is included.

Through the process described above, the central apparatus 200 can ascertain whether or not the terminal apparatus may maintain a state in which the operation is possible until the execution of the security process in the terminal apparatus is completed. That is, the central apparatus 200 according to the embodiment is operable to ascertain whether or not the terminal apparatus has residual power enough to achieve the completion of the security process.

It is also acceptable to configure in such a way that, in the process S102 in the embodiment, the terminal apparatus 100 acquires, as the process information, a level indicating a likelihood of achieving the completion of the security process, using the residual power detected by the residual power detection section 180, and a predicted time indicating a theoretical time from a start of the execution of the security process until a completion of the execution, acquired based on information relating to the configuration of the hardware.

For example, by a theoretical value of a power consumption per unit time for the execution of the security process being stored in advance in the storage section 120 of the terminal apparatus 100, the controller 110 of the terminal apparatus 100, using the residual power detected by the residual power detection section 180, and the theoretical value of the power consumption, may acquire a possible operating time indicating a theoretical time for which the terminal apparatus 100 can operate.

It is also acceptable that the terminal apparatus 100 according to the embodiment transmits the possible operating time indicating the theoretical time for which the terminal apparatus 100 may operate, acquired in the way described above, included in a notification SMS as the heretofore described level indicating the likelihood of achieving the completion of the security process.

Also, it is also acceptable that the terminal apparatus 100, using the possible operating time acquired in the way described above, and the predicted time indicating the theoretical time from the start of the execution of the security process until the completion of the execution, acquired based on information relating to the configuration of the hardware included in the terminal apparatus, acquires the heretofore described level indicating the likelihood of achieving the completion of the security process, and transmits the acquired level included in a notification SMS.

For example, it is acceptable that the terminal apparatus 100 acquires a percentage of the predicted time taken up by the possible operating time as the level indicating the likelihood of achieving the completion of the security process, and it is also acceptable that the terminal apparatus 100 acquires a difference between the predicted time and the possible operating time as the level indicating the likelihood of achieving the completion of the security process.

<<5. Flow of Security Process in Terminal Apparatus>>

Figure 8:
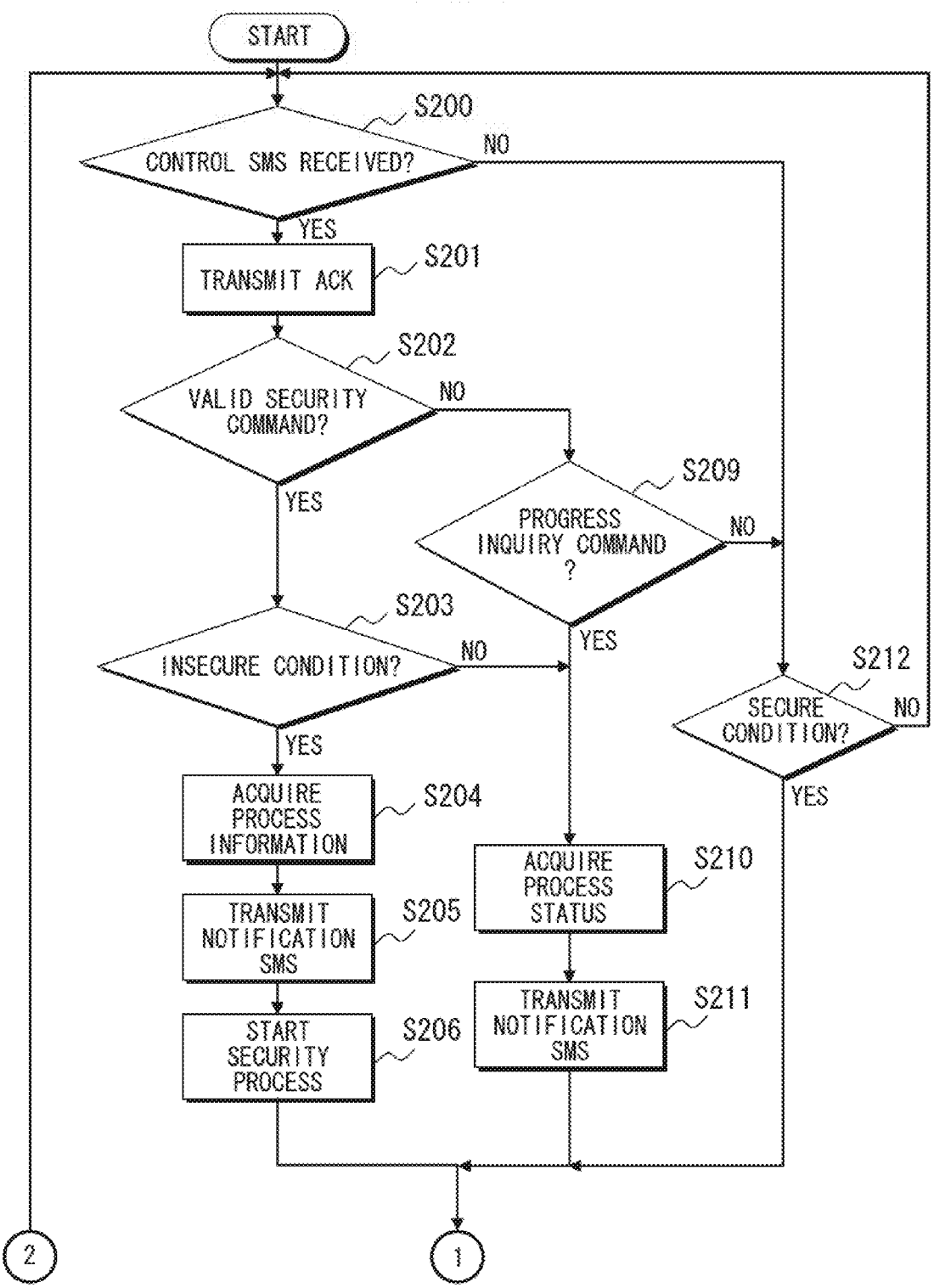
FIG. 8 illustrates a flow of a security process in the terminal apparatus according to embodiments 2 and 3.
Figure 9:
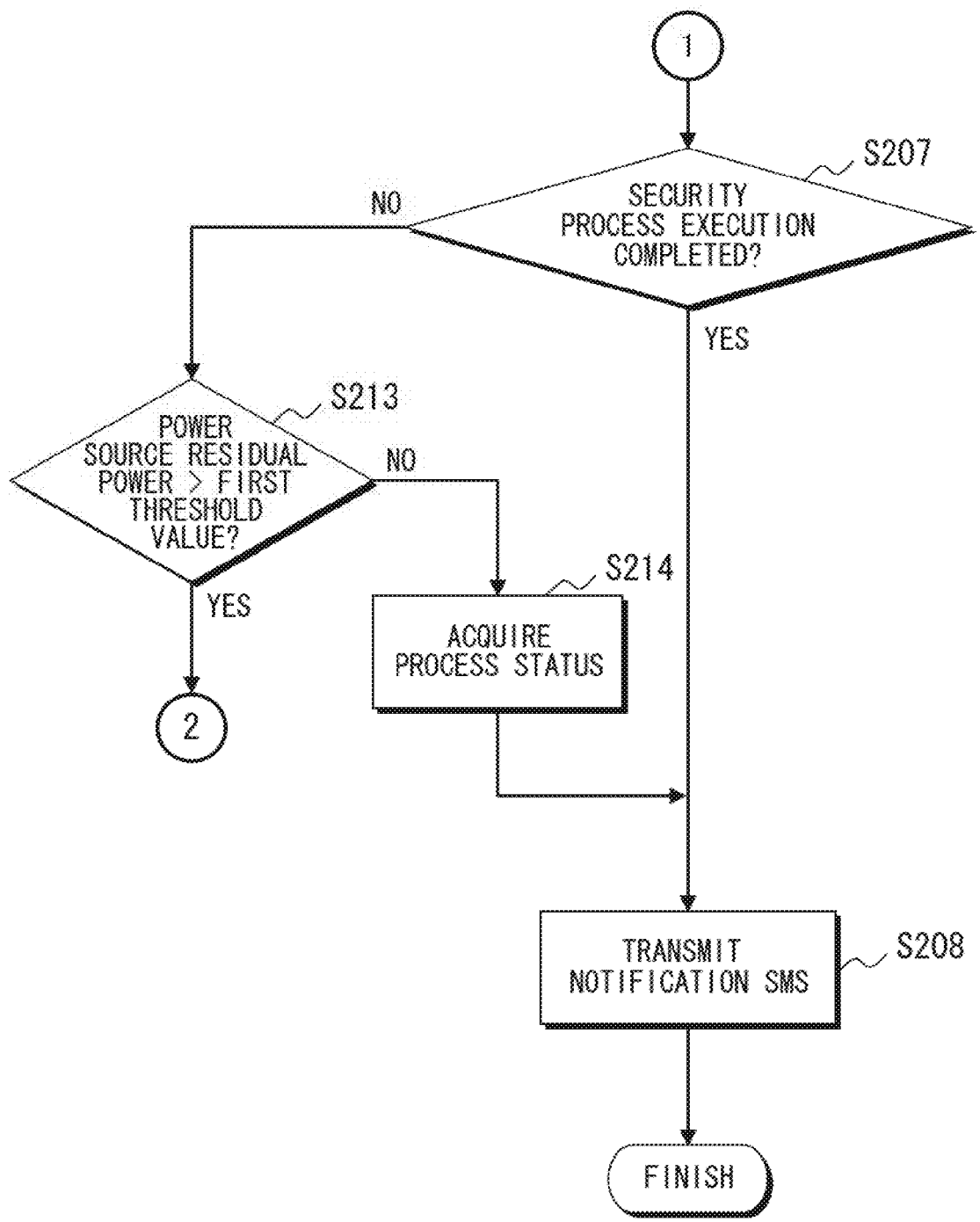
FIG. 9 illustrates a flow of a security process in the terminal apparatus according to embodiment 2.

FIGS. 8 and 9 illustrate a flow of the security process in the terminal apparatus 100 according to the embodiment.

In the flow of the security process in the terminal apparatus 100 illustrated in FIGS. 8 and 9, process procedures with details the same as the process procedures of embodiment 1 illustrated in FIG. 5 are given identical reference letters and numerals.

The process procedures illustrated in FIGS. 8 and 9 differ from the process procedures of embodiment 1 illustrated in FIG. 5 in that, for example, processes S213 and S214 are added.

Therein, in order to simplify the description, a description of process procedures with the same details will be partially omitted.

In the embodiment, if the controller 110 has received a control SMS including a valid security command from the central apparatus 200 (S200 to S203), the controller 110 acquires process information in the way heretofore described (S204).

The controller 110 acquires, for example, the predicted time acquired based on the information relating to the hardware configuration, and the possible operating time acquired based on the residual power detected by the residual power detection section 180, as the process information (S204).

The controller 110 transmits a notification SMS including the acquired process information to the central apparatus 200 (S205), and starts the security process (S206).

Also, if the controller 110 has received a control SMS including a progress inquiry command from the central apparatus 200 (S200 and S202: no, and S209: yes), the controller 110 acquires the process status of the security process being executed in the terminal apparatus 100, in the way heretofore described (S209).

For example, the controller 110 acquires the time elapsed from the start of the execution of the security process in the terminal apparatus 100 up to the present time, the storage capacity of the auxiliary storage section 122 physically formatted by the execution of the security process, the storage capacity, of the storage capacity of the auxiliary storage section 122, on which the execution of the security process is yet to be performed, and the like, as the process status.

The controller 110 transmits a notification SMS including the acquired process status to the central apparatus 200 (S211).

If the controller 110, after executing process S206 or S211, or after determining that the operation state of the terminal device 100 is in a security state in process S212, determines that the execution of the security process is not yet completed (S207: No), the controller 110 acquires the residual power of the power source detected by the residual power detection section 180 (Step 213).

The controller 110, by comparing the acquired residual power with the given threshold value (the first threshold value), determines whether or not the accomplishment of the security process is possible, based on the detected power source residual power (S213).

Herein, the heretofore described first threshold value may, for example, be set in advance in correlation to the power for the transmission of the notification SMS to the central apparatus 200.

If the controller 110 determines that the power source residual power does not exceed the first threshold value, that is, that based on the detected power source residual power the accomplishment of the security process is not possible (S213: No), the controller 110 acquires the process status of the security process being executed in the terminal apparatus in the same way as in process S210 (S214), and transmits a notification SMS including the acquired process status to the central apparatus 200 (S208).

According to the process described above, it is possible to notify the central apparatus 200 of the process status of the security process immediately before the power to maintain the operation in the terminal apparatus 100 is totally consumed.

That is, the central apparatus 200 can ascertain a more accurate process status of the security process executed in the terminal apparatus 100.

If it is determined, in process S213, that the accomplishment of the security process is possible (S213: Yes) based on the power source residual power, the controller 110 executes the process procedures again from process S200.

Embodiment 3

<<1. Components of Terminal Apparatus Program>>

Figure 19:
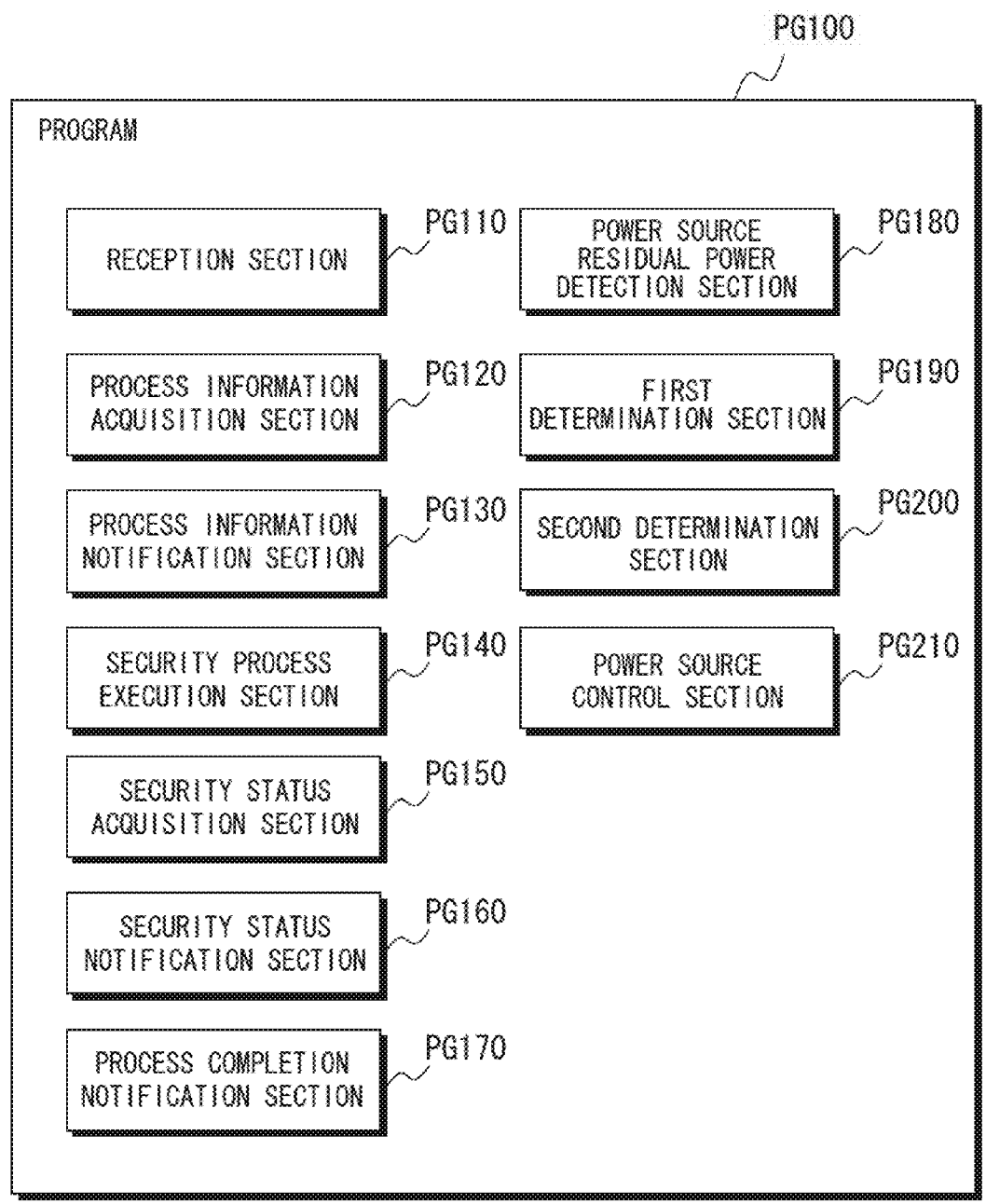
FIG. 19 illustrates components of a program executed in the terminal apparatus according to embodiment 3.

FIG. 19 illustrates components of a program executed in a terminal apparatus according to this embodiment.

The program components illustrated in FIG. 19 with configurations identical to those of the program components illustrated in the heretofore described embodiment 2 (refer to FIG. 18) are given identical reference letters and numerals.

The program components illustrated in FIG. 19 differ from the program components of embodiment 2 illustrated in FIG. 18 in that, for example, a second determination section (PG200) and a power source control section (PG210) are added.

The second determination section (PG200) added in the embodiment causes the controller 110 to operate as a component which compares the power source residual power detected by the residual power detection section (PG180) with a second threshold value, set at a value differing from the heretofore described first threshold value, and determines whether or not the power source residual power exceeds the second threshold value.

Also, the power source control section (PG210) causes the controller 110 to operate as a component which, in the event that it is determined in the heretofore described determination process in the second determination section (PG200) that the power source residual power does not exceed the second threshold value, transmits a signal to the power source section 170, via the communication line 130, limiting the power supply to the communication section 140.

As other configurations are the same as those of the heretofore described embodiment 2, description will be omitted.

<<2. Flow of Security Process in Terminal Apparatus>>

Figure 10:
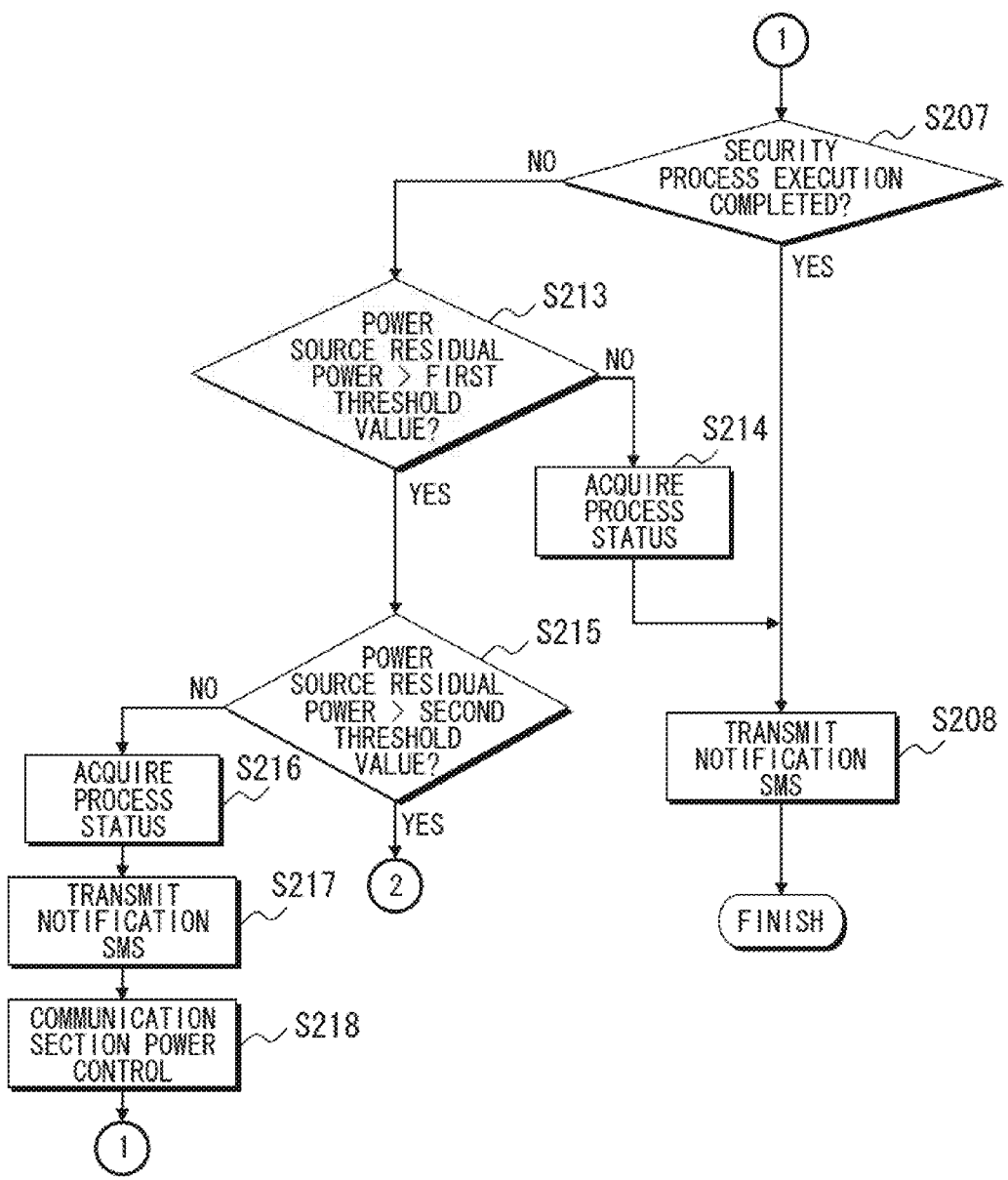
FIG. 10 illustrates a flow of a security process in the terminal apparatus according to embodiment 3.

FIGS. 8 and 10 illustrate a flow of the security process in the terminal apparatus 100 according to the embodiment.

As the configuration of the system, the configuration of the terminal apparatus 100 and central apparatus 200, and the flow of the communication process between the terminal apparatus 100 and central apparatus 200 in the embodiment are the same as in the heretofore described embodiment 2, description will be omitted.

As the flow of the security process in the terminal apparatus 100 illustrated in FIG. 8 is the same as in the heretofore described embodiment 2, description will be omitted.

In the flow of the security process in the terminal apparatus 100 illustrated in FIG. 10, process procedures with details the same as the process procedures of embodiment 1 illustrated in FIG. 5, and the process procedures of embodiment 2 illustrated in FIG. 9, are given identical reference letters and numerals.

The process procedures illustrated in FIG. 10 differ from the process procedures of embodiment 2 illustrated in FIG. 9 in that, for example, processes S215, S216, S217, and S218 are added.

Therein, in order to simplify the description, a description of process procedures with the same details will be partially omitted.

In the embodiment, if the controller 110 determines that the execution of the security process started based on the security command received from the central apparatus 200 is not completed (process S207: No), the controller 110 compares the power source residual power detected by the residual power detection section 180 with the first threshold value, in the same way as in the heretofore described embodiment 2 (S213).

Herein, the first threshold value may, for example, be set in advance in correlation to the power for the transmission of the notification SMS to the central apparatus 200.

If it determines that the power source residual power does not exceed the first threshold value, that is, that based on the detected power source residual power the accomplishment of the security process is not possible (S213: No), the controller 110 acquires the process status of the security process being executed in the terminal apparatus 100, in the same way as in process S210 (S214), and transmits a notification SMS including the acquired process status to the central apparatus 200 (S208).

Through the process described above, it is possible to notify the central apparatus 200 of the process status of the security process immediately before the power to maintain the operation in the terminal apparatus 100 is totally consumed.

If the controller 110 determines, in process S212, that the power source residual power exceeds the first threshold value (S213: Yes), the controller 110 compares the power source residual power with the second threshold value (S215).

Herein, the second threshold value may, for example, be set in advance in correlation to the power consumption for executing the physical formatting in the storage section which is the subject of the security process in the terminal apparatus 100.

It is more preferable that the second threshold value is set in correlation to a power consumption which is greater than the power consumption to which the first threshold value is set correlated.

That is, it is more preferable to set each threshold value in such a way that the relationship "the first threshold value<the second threshold value" is established.

If the controller 110 determines, in process S215, that the power source residual power does not exceed the second threshold value (S215: No), the controller 110 acquires the process status of the security process being executed in the terminal apparatus 100, in the same way as in process S213 (S216), and transmits a notification SMS, including the acquired process status and a code indicating the shift to a power saving mode, to the central apparatus 200 via the communication section 140 (S217).

According to process, it is possible to notify the central apparatus 200 of the latest execution status of the security process in the terminal apparatus 100.

Furthermore, in the event that it is not possible to receive a response from the terminal apparatus 100 to a control SMS transmitted to the terminal apparatus 100, the central apparatus 200 may ascertain that the reason is that the terminal apparatus 100 has shifted to the power saving mode.

The controller 110, after transmitting the notification SMS to the central apparatus 200, transmits an instruction to the power source section 170 causing the operational state to shift to the power saving mode, which limits the amount of power supplied to the communication section 140, and executes the process procedures from process S206.

The power source section 170, which receives the instruction from the controller 110, for example, cuts off the supply of power to the communication section 140.

According to the process described above, it is possible to save the power which had been consumed in the communication section 140 in order to confirm the existence or non-existence of a reception of a control SMS. Furthermore, it is possible to secure the power for the operation until the completion of the execution of the security process in the terminal apparatus 100.

Meanwhile, if it is determined, in process S215, that the power source residual power exceeds the second threshold value (S215: Yes), the process procedures are executed again from process S200.

According to the process described above, it is possible to balance the securing of a minimum power for the execution of the security process, and the securing of convenience by the notification of the process status in response to a progress inquiry from the central apparatus 200.

It is also acceptable that process procedures are configured so as to carry out the determination with the first threshold value in process S213 after carrying out the determination with the second threshold value in process S215.

Also, in process procedures, in the event that the operational state of the terminal apparatus 100 is in the power saving mode when transmitting a notification SMS to the central apparatus 200, the controller 110 transmits an instruction to the power source section 170, causing the power source section 170 to carry out a supply of power to the communication section 140 in order to transmit the notification SMS, and limiting the supply of power to the communication section 140 after the transmission of the notification SMS is completed.

The embodiments may be implemented in computing hardware (computing apparatus) and/or software, such as (in a non-limiting example) any computer that can store, retrieve, process and/or output data and/or communicate with other computers. The results produced may be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations may be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing apparatus comprising:
a storage medium; and
a processor configured to
receive a first control command transmitted from a central apparatus via a communication section,
acquire process information that indicates information relating to an execution of a security process in the storage medium when the first control command received is a security command that instructs the execution of the security process which disables information stored in the storage medium, the process information includes at least one of a storage capacity of the storage medium, a model name of the storage medium, and an estimated time for completing a formatting process of the storage medium,
transmit, via an SMS message, the process information acquired to the central apparatus via the communication section,
execute the security process in the storage medium when the first control command received is the security command that instructs the execution of the security process,
receive a second control command transmitted from the central apparatus,
acquire a status of the execution of the security process when the second control command received is an inquiry command that inquires about the status of the execution of the security process,
transmit the security process execution status acquired to the central apparatus via the communication section, and
transmit a fact that the execution of the security process in the storage medium is completed to the central apparatus when the execution of the security process is completed.

2. The information processing apparatus according to claim 1, further comprising:
a power source, and
wherein the processor is further configured to
detect a power source residual power of the power source,
compare the detected power source residual power with a first threshold value, and determine whether or not the power source residual power exceeds the first threshold value, and
acquire, when it is determined that the power source residual power does not exceed the first threshold value, an execution status of a security process, and transmit the acquired execution status to the central apparatus via the communication section.

3. The information processing apparatus according to claim 2, wherein the processor is further configured to:
compare the detected power source residual power with a second threshold value set at a value differing from the first threshold value, and determine whether or not the power source residual power exceeds the second threshold value; and
limit, when it is determined that the power source residual power does not exceed the second threshold value, a supply of power to the communication section.

4. The information processing apparatus according to claim 2, wherein the first threshold value is set in correlation to power consumed in the information processing apparatus when transmitting the execution status of the security process to the central apparatus, via the communication section.

5. The information processing apparatus according to claim 3, wherein the second threshold value is set in correlation to power consumed in the information processing apparatus until a completion of an execution of a security process in the storage medium.

6. A non-transitory computer readable medium storing a program used in an information processing apparatus having a communication section operable to communicate with a central apparatus via a communication line, and a storage control section operable to control writing onto, and reading from, a storage medium, the program causing the information processing apparatus to execute:
receiving a first control command transmitted from the central apparatus via the communication section;
acquiring, when the first control command received is a security command instructing an execution of a security process which disables information stored in the storage medium, process information indicating information relating to the execution of the security process in the storage medium, the process information includes at least one of a storage capacity of the storage medium, a model name of the storage medium, and an estimated time for completing a formatting process of the storage medium;
transmitting, via an SMS message, the process information acquired to the central apparatus via the communication section;
executing, when the first control command received is a security command instructing an execution of the security process, the security process in the storage medium;
receiving a second control command transmitted from the central apparatus via the communication section;
acquiring, when the second control command received is an inquiry command inquiring about the status of the execution of the security process by the security process execution section, the status of the execution of the security process by the security process execution section;
transmitting the security process execution status acquired to the central apparatus via the communication section; and
transmitting, when the execution of the security process by the security process execution section is completed, the fact that the execution of the security process in the storage medium is completed to the central apparatus.

* * * * *